(12) United States Patent
Cao et al.

(10) Patent No.: US 12,266,045 B2
(45) Date of Patent: Apr. 1, 2025

(54) LIGHTMAP UPDATING METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Shun Cao, Shenzhen (CN); Huabing Xu, Shenzhen (CN); Yuanheng Li, Shenzhen (CN); Nan Wei, Shenzhen (CN); Xiaochun Cui, Shenzhen (CN); Congbing Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 323 days.

(21) Appl. No.: 17/891,485

(22) Filed: Aug. 19, 2022

(65) Prior Publication Data

US 2022/0392144 A1 Dec. 8, 2022

Related U.S. Application Data

(63) Continuation of application No. PCT/CN2021/113716, filed on Aug. 20, 2021.

(30) Foreign Application Priority Data

Aug. 27, 2020 (CN) .......................... 202010878803.2

(51) Int. Cl.
*G06T 15/00* (2011.01)
*G06T 7/13* (2017.01)
(Continued)

(52) U.S. Cl.
CPC ................ *G06T 15/04* (2013.01); *G06T 7/13* (2017.01); *G06T 7/60* (2013.01); *G06T 7/73* (2017.01); *G06T 2215/12* (2013.01)

(58) Field of Classification Search
CPC .. G06T 15/04; G06T 7/73; G06T 7/13; G06T 7/60; G06T 2215/12
See application file for complete search history.

(56) References Cited

U.S. PATENT DOCUMENTS

| 7,006,090 B2 | 2/2006 | Mittring |
| 2006/0114262 A1* | 6/2006 | Yamauchi ............... G06T 15/04 345/582 |
| 2015/0187135 A1* | 7/2015 | Magder ................... G06T 15/04 345/420 |

FOREIGN PATENT DOCUMENTS

| CN | 103345771 A | 10/2013 |
| CN | 109427083 A | 3/2019 |

(Continued)

OTHER PUBLICATIONS

International Search Report and Written Opinion for International Application No. PCT/CN2021/113716 mailed Oct. 27, 2021 including translation of International Search Report (11 pages).

(Continued)

*Primary Examiner* — Michelle L Sams
(74) *Attorney, Agent, or Firm* — Crowell & Moring LLP

(57) ABSTRACT

This application discloses an image rendering method and apparatus, an electronic device, and a storage medium, and belongs to the field of image processing technologies. The method includes: acquiring a lightmap of a target three-dimensional model in response to a light rendering instruction; acquiring a seam edge of the target three-dimensional model; determining, in the lightmap, a target pixel corresponding to the seam edge; and updating an initial pixel value of the target pixel in the lightmap to obtain a repaired lightmap. In this application, the seam edge of the target three-dimensional model is automatically identified, and the pixel value of the target pixel is automatically updated, so that automatic recognition and automatic repair of a seam (Continued)

problem can be completed by one click, thereby avoiding a waste of labor resources for troubleshooting and repairing the seam problem, reducing image rendering time, and improving image rendering efficiency.

17 Claims, 6 Drawing Sheets

(51) Int. Cl.
*G06T 7/60* (2017.01)
*G06T 7/73* (2017.01)
*G06T 15/04* (2011.01)

(56) References Cited

FOREIGN PATENT DOCUMENTS

| | | | | | |
|---|---|---|---|---|---|
| CN | 111311723 | A | * | 6/2020 | ............. G06T 15/06 |
| CN | 111932664 | A | | 11/2020 | |

OTHER PUBLICATIONS

European Search Report of EP 21860273.8 dated May 15, 2023, 7 pages.
Purvis, Alan, "Development of Arclight, a Global Illumination Renderer for the creation of realistic lightmap textures", Department of Computer Science, Trinity College Dublin, 2007, 8 pages.
Jendersie, Johannes et al., "Precomputed illuminance composition for real-time global illumination", Interactive 3D Graphics and Games, Feb. 27, 2016, 9 pages.

* cited by examiner

LIGHTMAP UPDATING METHOD AND APPARATUS, ELECTRONIC DEVICE, AND STORAGE MEDIUM

RELATED APPLICATION

This application is a continuation of International Patent Application No. PCT/CN2021/113716, filed Aug. 20, 2021, claims priority to Chinese Patent Application No. 202010878803.2, entitled "IMAGE RENDERING METHOD AND APPARATUS, ELECTRONIC DEVICE, AND STORAGE MEDIUM" filed on Aug. 27, 2020. The contents of International Patent Application No. PCT/CN2021/113716 and Chinese Patent Application No. 202010878803.2 are each incorporated by reference in their entirety.

FIELD OF THE TECHNOLOGY

This application relates to the field of image processing technologies, and in particular, to an image rendering method and apparatus, an electronic device, and a storage medium.

BACKGROUND OF THE DISCLOSURE

With development of an image processing technology, a terminal can perform image rendering based on a graphics processing unit (GPU). Light rendering is an important part of image rendering, and is mainly used for rendering a lighting visual effect presented by an object.

In a light rendering process, after a three-dimensional (3D) model of a to-be-rendered object is created, a mesh of the 3D model needs to be unwrapped to two-dimensional space to obtain a two-dimensional image. Because the two-dimensional space is also referred to as a UV space, this unwrapping process is also referred to as UV unwrapping, and a two-dimensional image obtained by UV unwrapping is also referred to as a lightmap. Then, light rendering is performed on each pixel of the lightmap based on a rendering engine, to obtain a finally light-rendered image.

SUMMARY

Embodiments of this application provide an image rendering method and apparatus, an electronic device, and a storage medium. The technical solutions are as follows.

According to one aspect, an image rendering method is provided, and the method includes:
acquiring a lightmap of a target three-dimensional model according to a light rendering instruction;
  acquiring a seam edge of the target three-dimensional model, the seam edge being an edge line that is on the same surface in the target three-dimensional model and that is discontinuously textured in the lightmap;
  determining a target pixel in the lightmap based on the seam edge; and
  updating the target pixel to obtain a repaired lightmap, a texture of the seam edge in the repaired lightmap being continuous.

According to one aspect, an image rendering apparatus is provided, and the apparatus includes:
  a first acquiring module, configured to acquire a lightmap of a target three-dimensional model according to a light rendering instruction;
  a second acquiring module, configured to acquire a seam edge of the target three-dimensional model, the seam edge being an edge line that is on the same surface in the target three-dimensional model and that is discontinuously textured in the lightmap;
  a first determining module, configured to determine a target pixel in the lightmap based on the seam edge; and
  an updating module, configured to update the target pixel to obtain a repaired lightmap, a texture of the seam edge in the repaired lightmap being continuous.

In a possible implementation, a group of seam edges includes a directed edge and a reverse edge of the directed edge, and vertexes between the directed edge and the reverse edge overlap and have opposite directions; and
  the second obtaining module is configured to:
  acquire a plurality of vertexes on at least one surface of the target three-dimensional model; and
  determine, in response to existence of a reverse edge of a directed edge formed by at least two vertexes of the plurality of vertexes, the directed edge and the reverse edge as a group of seam edges.

In a possible implementation, the apparatus further includes:
  a second determining module, configured to determine a directed edge based on any one of the plurality of vertexes and a next vertex;
  a third determining module, configured to determine an auxiliary edge whose vertex overlaps with a vertex of the directed edge and whose direction is opposite to a direction of the directed edge; and
  a fourth determining module, configured to determine, according to the directed edge and the auxiliary edge, whether the directed edge has the reverse edge.

In a possible implementation, the fourth determining module is configured to:
  determine that the directed edge has a reverse edge in response to a same edge as the auxiliary edge being found in a directed edge set of the target three-dimensional model; and
  add the directed edge to the directed edge set in response to the same edge as the auxiliary edge not being found in the directed edge set of the target three-dimensional model.

In a possible implementation, the first determining module includes:
  a first acquiring unit, configured to acquire pixel location information of a vertex of any group of seam edges in the lightmap;
  a first determining unit, configured to determine a pixel sampling quantity of the any group of seam edges based on the pixel location information of the vertex; and
  a second determining unit, configured to determine, based on the pixel location information and the pixel sampling quantity, a target pixel corresponding to the any group of seam edges.

In a possible implementation, the second determining unit is configured to:
  determine an iteration operation of a sampling process according to the pixel location information and the pixel sampling quantity; and
  use any vertex as a start point, and use a sampling point determined based on the iteration operation as the target pixel.

In a possible implementation, the first determining unit is configured to:
  acquire an edge length of a directed edge in the any group of seam edges and an edge length of a reverse edge of the directed edge; and determine a value obtained by multiplying a maximum value of the edge length of the directed edge and the edge length of the reverse edge by a sampling quality parameter, as the pixel sampling quantity.

In a possible implementation, the updating module includes:

a construction unit, configured to construct a first matrix and a second matrix based on a pixel value of the target pixel, the first matrix being used for indicating pixel information of the target pixel on a directed edge and a reverse edge in a group of seam edges, and the second matrix being used for indicating an initial pixel value of the target pixel in the lightmap;

a second acquiring unit, configured to acquire a third matrix based on the first matrix and the second matrix, the third matrix being used for indicating a to-be-updated pixel value of the target pixel; and an updating unit, configured to update the target pixel from the initial pixel value to the to-be-updated pixel value based on the third matrix, to obtain the repaired lightmap.

In a possible implementation, the second acquiring unit is configured to:

process the first matrix and the second matrix based on a conjugate gradient method, to obtain the third matrix; or process the first matrix and the second matrix based on a least square method, to obtain the third matrix; or process the first matrix and the second matrix based on the Cholesky decomposition method, to obtain the third matrix.

In a possible implementation, a quantity of rows of the first matrix is a first target quantity, a quantity of columns thereof is a second target quantity, the first target quantity is a value obtained by adding a sampling quantity of the seam edge to a quantity of target pixels, and the second target quantity is the quantity of target pixels; and a quantity of rows of the second matrix is the first target quantity, and a quantity of columns of the second matrix is one.

According to one aspect, an electronic device is provided, where the electronic device includes one or more processors and one or more memories, the one or more memories store at least one segment of program code, and the at least one segment of program code is loaded and executed by the one or more processors to implement the image rendering method in any one of the foregoing possible implementations.

According to one aspect, a computer readable storage medium is provided, where the storage medium stores at least one segment of program code, and the at least one segment of program code is loaded and executed by a processor to implement the image rendering method in any one of the foregoing possible implementations.

According to one aspect, a computer program product or a computer program is provided, including one or more pieces of program code, the one or more pieces of program code being stored in a computer-readable storage medium. One or more processors of the electronic device can read the one or more segments of program code from the computer readable storage medium, and the one or more processors execute the one or more segments of program code, so that the electronic device can execute the image rendering method in any one of the foregoing possible implementations.

DESCRIPTION OF EMBODIMENTS

Figure 1:
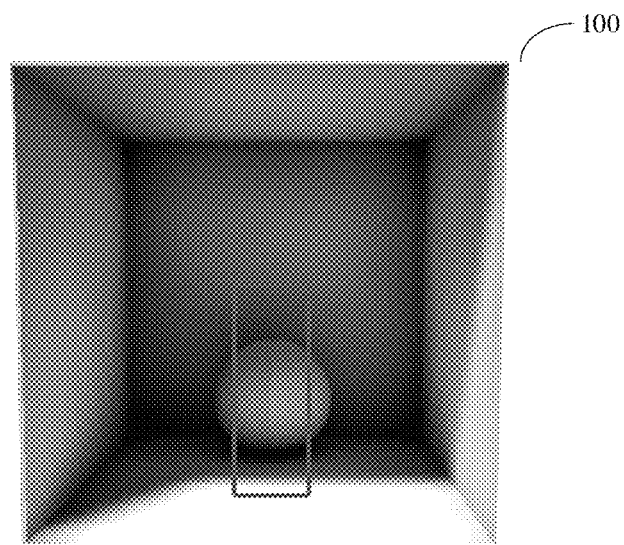
FIG. 1 is a schematic interface diagram of a seam problem according to an embodiment of this application.

To make objectives, technical solutions, and advantages of this application clearer, the following further describes implementations of this application in detail with reference to the accompanying drawings.

The terms "first", "second", and the like in this application are used for distinguishing between same items or similar items of which effects and functions are basically the same. It is to be understood that, the "first", "second", and "nth" do not have a dependency relationship in logic or time sequence, and a quantity and an execution order thereof are not limited.

The term "at least one" in this application means one or more and "a plurality of" means two or more. For example, a plurality of first positions means two or more first positions.

Before the embodiments of this application are described, some terms involved in this application are first explained.

A lightmap is three-dimensional (3D) model data of a static object, and an image that pre-generates light information by using a global lightmap algorithm is used for indicating a light visual effect of the static object.

UV unwrapping refers to a process of mapping a mesh of 3D model data to a two-dimensional (2D) image, that is, a light rendering process from a target three-dimensional model to a lightmap.

In theory, bilinear interpolation is an extension of linear interpolation on a two-dimensional right-angle mesh, and is used for performing interpolation processing on a bivariate function. A core idea is to separately perform linear interpolation once in two directions.

Rasterization is a process of converting vertex data into a fragment, and has a function of converting original image data into an image formed by meshes, characterized in that each element in the fragment is corresponding to one pixel in a frame buffer. In other words, rasterization is a process of transforming a geometric primitive into a two-dimensional picture.

Path tracing is a rendering method proposed by Kajiya in 1986 and is the first unbiased rendering method. A basic idea of a path tracing method is to emit a light ray from a viewpoint. When the light ray intersects a surface of an object, sampling is continued in a direction according to a material attribute of the surface, and another light ray is emitted, by analogy, until the light ray strikes a light source (or escapes from a scenario). Then a contribution of the light ray is calculated by using the Monte Carlo method, as a color value of a pixel. However, the Monte Carlo method is unbiased for integral solving. As long as time is long enough, a final image can converge to a correct result.

Sparse matrix: In a matrix, if a quantity of elements whose values are 0 is far more than a quantity of non-zero elements, and distribution of the non-zero elements is irregular, the matrix is referred to as a sparse matrix. In other words, if a value proportion of non-zero elements of a matrix to all elements is less than a proportion threshold, the matrix belongs to a sparse matrix.

A least square method is an optimization method that can be used for finding a best match function of data by minimizing a sum of squares of errors.

Cholesky decomposition is to divide a positive-definite Hermitian matrix into a product of a lower triangular matrix and a conjugate transpose matrix of the lower triangular matrix. The Cholesky decomposition method is mainly used for solving a system of linear equations Ax=b.

Directional derivative is a concept in analytics, in particular, multivariable calculus. A directional derivative of a scalar field at a point along a vector direction depicts an instantaneous rate of change of the scalar field near the point along the vector direction. The directional derivative is generalization of the concept of partial derivatives.

Gradient is originally a vector, and represents a maximum value of a directional derivative of a function at the point taken in the direction, that is, the function changes fastest in the direction (a direction of the gradient) at the point, and a change rate is the highest (equal to a modulus of the gradient).

Positive-definite matrix: Given a real symmetric matrix A whose size is n×n, if $X^T AX>0$ is constantly valid for any non-zero vector X whose length is n×n, the matrix A is a positive-definite matrix. That is, for a vector X, we hope that an angle between a new vector M obtained after a change of the matrix A and the vector X is less than 90 degrees.

Conjugate gradient method is a method for solving a numerical solution of a system of linear equations whose coefficient matrix is a symmetric positive-definite matrix. The conjugate gradient method belongs to an iteration method, which is applicable to a system of linear equations where a coefficient matrix is a sparse matrix, because a large calculation amount is involved in a direct method such as Cholesky decomposition when used for solving such a system.

In a light rendering process, after a three-dimensional (3D) model of a to-be-rendered object is created, a mesh of the 3D model needs to be unwrapped to two-dimensional space to obtain a two-dimensional image. Because the two-dimensional space is also referred to as a UV space, this unwrapping process is also referred to as UV unwrapping, and a two-dimensional image obtained by UV unwrapping is also referred to as a lightmap. Then, light rendering is performed on each pixel of the lightmap based on a rendering engine, to obtain a finally light-rendered image.

UV coordinates of neighboring faces in the mesh of the 3D model may be split in an unwrapping process, and light information of the divided neighboring faces in the lightmap is relatively different, resulting in a visual effect of relatively split light on the neighboring faces of image after final light rendering. As shown in 100 in FIG. 1, this problem is referred to as a "seam problem". Currently, a person skilled in the art needs to manually troubleshoot and manually repair the seam problem, and perform UV unwrapping and light rendering again, which causes long and low efficiency of image rendering. In view of this, an embodiment of this application provides an image rendering method, which is described in detail in the following.

Figure 2:
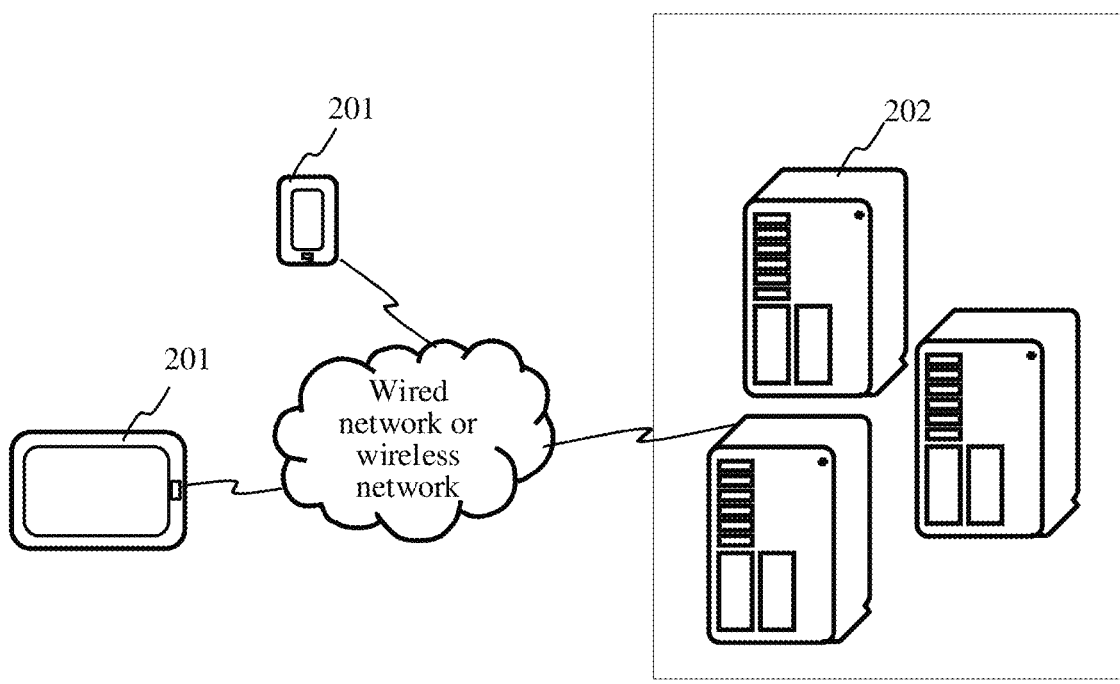
FIG. 2 is a schematic diagram of an implementation environment of an image rendering method according to an embodiment of this application.

FIG. 2 is a schematic diagram of an implementation environment of an image rendering method according to an embodiment of this application. Referring to FIG. 2, this embodiment includes a terminal 201 and a server 202, where the terminal 201 is any terminal that can provide an image rendering service, and the server 202 is any server that can provide an image downloading service.

In some embodiments, the image rendering method provided in this embodiment of this application is applied to the terminal 201, that is, the terminal 201 performs rendering based on a target three-dimensional model and based on a rendering engine, to obtain a lightmap thereof, and displays, on the terminal 201, the lightmap obtained by means of light rendering.

In the foregoing case, there are one or more terminals 201. Each terminal 201 independently performs a rendering operation. Target three-dimensional models rendered on different terminals may be the same or different. This is not specifically limited in this embodiment of this application.

The terminal 201 and the server 202 may be directly or indirectly connected through wired or wireless communication, which is not limited in this application.

Optionally, after the lightmap is obtained through rendering, the terminal 201 uploads the rendered lightmap to the server 202, and the server 202 provides an image downloading service, so that any terminal can download the lightmap after logging in to the server 202, so as to view the lightmap at any time.

The server 202 includes at least one of one server, a plurality of servers, a cloud computing platform, and a virtualization center. Optionally, the server 202 undertakes the primary computing work, and the terminal 201 undertakes the secondary computing work. Alternatively, the server 202 undertakes the secondary computing work, and the terminal 201 undertakes the primary computing work. Alternatively, cooperative computing is performed between the terminal 201 and the server 202 by using a distributed computing architecture.

In some embodiments, the terminal 201 generally refers to one of a plurality of terminals. A device type of the terminal 201 includes but is not limited to: a smartphone, a tablet computer, a notebook computer, a desktop computer, a smart speaker, a smart watch, an e-book reader, a moving picture experts group audio layer III (MP3) player, a moving picture experts group audio layer IV (MP4) player, and the like, but is not limited thereto. The following embodiments are described by using an example in which a terminal includes a desktop computer.

In some embodiments, the server is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

Figure 3:
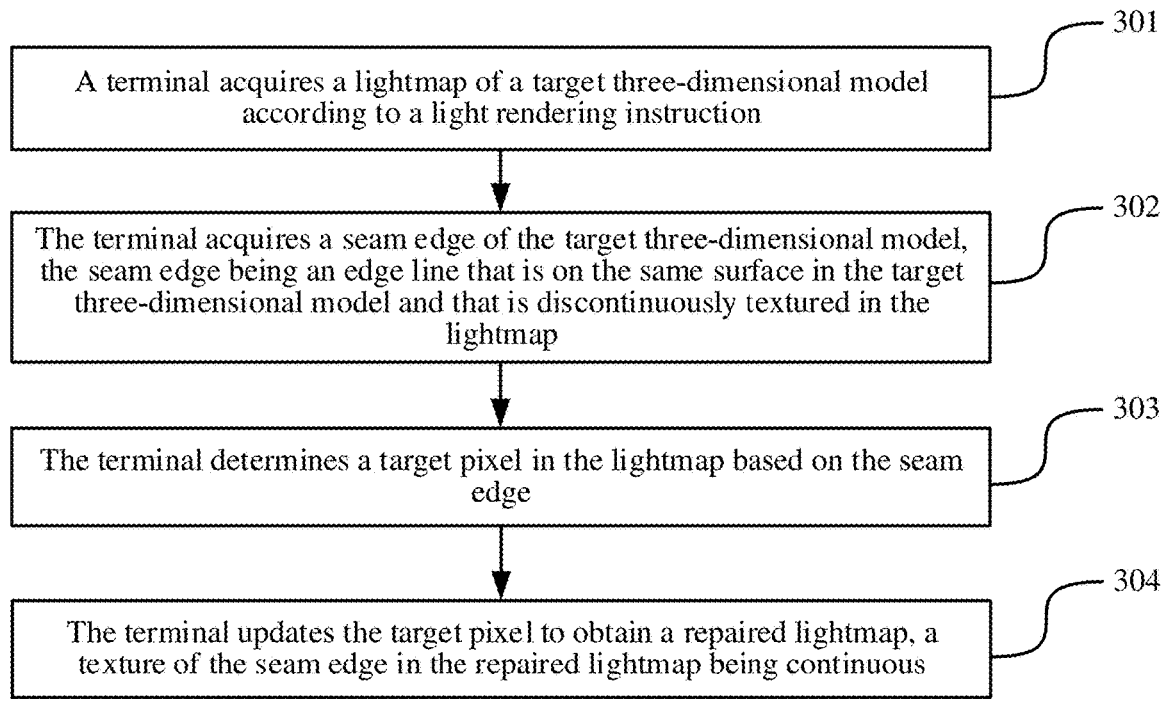
FIG. 3 is a flowchart of an image rendering method according to an embodiment of this application.

FIG. 3 is a flowchart of an image rendering method according to an embodiment of this application. Referring to FIG. 3, this embodiment is performed by an electronic device. The following uses an example in which the electronic device is a terminal for description. This embodiment includes:

301. A terminal acquires a lightmap of a target three-dimensional model according to a light rendering instruction.

The target three-dimensional model is a three-dimensional model to be rendered this time, and the target three-dimensional model corresponds to at least one object. For example, the target three-dimensional model is a three-dimensional model of a single object in a virtual scenario, or the target three-dimensional model is three-dimensional models of a plurality of objects in a virtual scenario.

Step 301 is a possible implementation in which the terminal acquires the lightmap of the target three-dimensional model in response to the light rendering instruction. In some embodiments, when rendering is performed the target three-dimensional model, light rendering is performed on the target three-dimensional model. Optionally, the terminal performs light rendering on the target three-dimensional model based on a rendering engine.

Optionally, after acquiring the target three-dimensional model, the terminal receives the light rendering instruction, and renders, based on the light rendering instruction, each pixel of the lightmap by using a path tracing algorithm, that is, obtains the lightmap of the target three-dimensional model.

In an example, the terminal receives a lightmap rendering instruction of a target three-dimensional model of any object, and renders each pixel of the lightmap by using the path tracing algorithm, to finally obtain a lightmap of the object, so that an unbiased light rendering effect can be achieved.

In a process of rendering based on the path tracing algorithm, a light ray may be emitted from a viewpoint. When the light ray intersects a surface of an object, sampling is continued in a direction according to a material attribute of the surface, and another light ray is emitted, by analogy, until the light ray strikes a light source (or escapes from a scenario). Then a contribution of the light ray is calculated by using the Monte Carlo method, as a color value of a pixel. In short, the path tracing algorithm is to obtain an integral solution based on a ray tracing algorithm and combined with the Monte Carlo method. Because the Monte Carlo method is unbiased for the integral solution, as long as time is long enough, a global lightmap can be finally converged, and therefore, an unbiased light rendering effect can be achieved based on the path tracing algorithm.

In some embodiments, the terminal may further perform light rendering based on a rasterization method or the ray tracing algorithm, so as to simplify a calculation amount of the light rendering process. A manner of light rendering is not specifically limited in this embodiment of this application.

302. The terminal acquires a seam edge of the target three-dimensional model, the seam edge being an edge line that is on the same surface in the target three-dimensional model and that is discontinuously textured in the lightmap.

Because a seam edge is located on the same surface in the target three-dimensional model, a pixel corresponding to the seam edge and a neighboring point thereof also have a continuous texture in the lightmap. However, in a process of UV unwrapping, the seam edge may be separately unwrapped to a non-neighboring location of the lightmap. If a texture of the pixel at the non-neighboring location is discontinuous, a seam problem is generated. For example, when a side of a cylinder is unwrapped to a rectangular lightmap, a left edge line and a right edge line of the lightmap are actually the same seam edge in a 3D model of the cylinder. If a texture of the left edge line and the right edge line of the lightmap is discontinuous (for example, a pixel value of a pixel is abruptly changed), a rendered cylinder is caused. Transition is not smooth on both edges of the seam edge, that is, a seam problem is generated. Such a problem needs to be repaired in image rendering.

In the foregoing process, after performing step 301, the terminal may automatically identify the seam edge of the target three-dimensional model, or before performing step 301, the terminal pre-identifies the seam edge of the three-dimensional model. This embodiment of this application sets no specific limitation on a sequence of performing the two steps of identifying the seam edge and rendering the lightmap.

Step 302 is a process in which the terminal automatically identifies a seam problem. When a seam problem occurs, at least one group of seam edges exists in a three-dimensional model of each object. As shown in a block area in FIG. 1, it may be learned that a group of seam edges includes a directed edge and a reverse edge of the directed edge, and a vertex of the directed edge overlaps with a vertex of the reverse edge and their directions are opposite to each other. Because the directed edge and the reverse edge are originally on the same edge in the target three-dimensional model, a continuous smooth light transition effect is presented in this case. In a case of a seam problem, the directed edge and the reverse edge are split in the lightmap, and therefore, abnormal manifestations of a discontinuous texture and unsmooth light transition are presented on the same surface in the block area shown in FIG. 1.

In some embodiments, the terminal may identify a seam edge in the following manner: The terminal acquires a plurality of vertexes on at least one surface of the target three-dimensional model; and determines, in response to existence of a reverse edge of a directed edge formed by at least two vertexes of the plurality of vertexes, the directed edge and the reverse edge as a group of seam edges.

In the foregoing process, vertex information that needs to be acquired in a rendering phase of the target three-dimensional model is directly used for completing automatic identification and determining of the seam edge. No extra external data is needed, and no extra labor costs are needed. Therefore, image rendering efficiency can be greatly improved, and labor costs of image rendering can be reduced.

Optionally, in a process of acquiring a vertex, the terminal may acquire mesh information of the target three-dimensional model based on bake task information of the target three-dimensional model. Bake is a process of acquiring the lightmap based on model data of the target three-dimensional model. Therefore, the bake task information is task information created by the terminal based on a light rendering instruction. The mesh information includes vertex information, normal information, UV coordinates, triangle surface information, and the like in each surface. The triangle surface herein refers to a model surface uniquely determined by three vertexes. Then, the terminal may acquire a plurality of vertexes on at least one surface of the target three-dimensional model from the mesh information.

In some embodiments, before acquiring the seam edge, the terminal may further perform the following initialization step: creating a set (denoted as Seams) that is used for recording two directed edge pairs, where each element in the set is a pair of opposite directed edges (the directed edge is denoted as VertexEdge and the auxiliary edge is denoted as ReversedEdge), and the auxiliary edge herein is an edge constructed based on the directed edge, which is not necessarily a real directed edge in the target three-dimensional model, and initializes Seams as a null set. In addition, a directed edge set is created, and the directed edge set is used for recording a real directed edge in the target three-dimensional model. Optionally, the directed edge set is a data structure such as a dictionary, an array, a list, a queue, and a stack. This is not limited in this embodiment of this application. In an example, the directed edge set is a dictionary set, denoted as EdgeMap, the dictionary set is a key-value stored data structure, a Key value is a directed edge, and a Value includes normal line information and UV coordinates of two vertexes of the directed edge.

In the foregoing process, the directed edge pair set Seams and the dictionary set EdgeMap are initialized, so that traversal recognition is quickly performed in a process of automatically identifying a seam edge, thereby accelerating a speed of identifying the seam edge and improving efficiency of identifying the seam edge.

After creating the directed edge pair set Seams and the dictionary set EdgeMap, optionally, the terminal determines, based on the following operation, whether any directed edge has a reverse edge: determining a directed edge based on any one of the plurality of vertexes and a next vertex; determining an auxiliary edge whose vertex overlaps with a vertex of the directed edge and whose direction is opposite to a direction of the directed edge; and determining, according to the directed edge and the auxiliary edge, whether the directed edge has the reverse edge; optionally, determining the auxiliary edge as the reverse edge of the directed edge in event that the auxiliary edge is another directed edge.

In an example, the terminal may perform the following traversal operation, so as to determine whether a directed edge formed by at least two vertexes has its reverse edge: traversing each surface of the target three-dimensional model, where each surface is a triangular surface, and traversing three vertexes in any triangular surface. Next, (1) generate a directed edge VertexEdge according to a current vertex and a next vertex of the current vertex. (2) Create, according to the directed edge VertexEdge, an auxiliary edge ReversedEdge whose vertex overlaps with the vertex of the directed edge and has an opposite direction. (3) Next, in the created dictionary set EdgeMap, it is searched for whether data corresponding to the auxiliary edge ReversedEdge exists. If data corresponding to the auxiliary edge ReversedEdge exists in the dictionary set EdgeMap, it indicates that a seam problem occurs. The seam edge is a group of directed edge pairs (VertexEdge and ReversedEdge) formed by the directed edge and the reverse edge, and the directed edge pair (VertexEdge and ReversedEdge) is inserted into the directed edge pair set Seams. Otherwise, if no corresponding data exists in the dictionary set EdgeMap, it indicates that there is no seam problem on the directed edge VertexEdge, and the directed edge VertexEdge is inserted into the dictionary set EdgeMap, to continue to traverse the next vertex in the current surface, and cyclically perform the foregoing process until each vertex in each surface is traversed and a final directed edge pair set is returned.

In some embodiments, when determining whether data corresponding to the auxiliary edge ReversedEdge of the directed edge exists in the dictionary set EdgeMap, the terminal follows the following two determining principles. If a target directed edge exists in the dictionary set EdgeMap, (1) UV coordinates of the target directed edge are the same as those of the auxiliary edge ReversedEdge. (2) The angle between the normal of the auxiliary edge ReversedEdge and the two vertexes of the target directed edge is less than an angle threshold, which indicates that the target directed edge and the auxiliary edge ReversedEdge are on the same edge (that is, the two edges overlap), and indicates that a seam problem occurs. The angle threshold of the seam in the editor may be set to normalcosthreadhold.

In the foregoing process, in event that an edge that is the same as the auxiliary edge ReversedEdge is found in the directed edge set EdgeMap of the target three-dimensional model, it is determined that a reverse edge exists for the directed edge VertexEdge, and the auxiliary edge is determined as the reverse edge of the directed edge. In event that the same edge as the auxiliary edge ReversedEdge cannot be found in the directed edge set of the target three-dimensional model EdgeMap, the directed edge VertexEdge is added to the directed edge set EdgeMap. In this way, in a cyclic process, a group of directed edge pairs that have a reverse edge can be identified and added to the directed edge pair set Seams, and the directed edge pair set Seams is used as a return value after final traversal is completed. In addition, a directed edge that does not have a reverse edge can be inserted into the directed edge set EdgeMap, and a quantity of elements in the directed edge set EdgeMap that need to be identified in a next cyclic process can be expanded, thereby improving accuracy of identifying a seam edge.

303. The terminal determines a target pixel in the lightmap based on the seam edge.

The target pixel is a to-be-repaired pixel in a current seam problem repair process.

Step 303 is a process in which the terminal automatically repairs a seam problem. In other words, the terminal determines, in the lightmap, a target pixel corresponding to the seam edge. After the seam edge is determined from step 302, the terminal may collect pixel information of pixels that form a group of seam edge pixels in the lightmap. Optionally, pixel information of a pixel includes pixel location information (that is, location coordinates) and pixel color information (that is, light color information) of the pixel, and a data set formed by pixel information of a pixel forming each group of seam edges is denoted as SeamTexels.

In some embodiments, for any group of seam edges, the terminal determines a target pixel in the following manner: acquiring, for any group of seam edges, pixel location information of a pixel corresponding to a vertex of the seam edge in the lightmap; determining, based on the pixel location information, a pixel sampling quantity corresponding to the seam edge; and determining, based on the pixel location information and the pixel sampling quantity, a target pixel corresponding to the any group of seam edges.

When acquiring pixel location information of a vertex, the terminal may perform the following steps: traversing each group of seam edges (one group of seam edges includes a pair of opposite directed edges A and B) in each directed edge pair set Seams, and then the terminal separately acquires pixel location information of pixels corresponding to vertexes of the directed edges A and B in the lightmap: (StartPosA, EndPosA, StartPosB, EndPosB). StartPosA is pixel location information of the pixel corresponding to the start vertex of the directed edge A, EndPosA is pixel location information of the pixel corresponding to the end vertex of the directed edge A, StartPosB is pixel location information of the pixel corresponding to the start vertex of the directed edge B, and EndPosB is pixel location information of the pixel corresponding to the end vertex of the directed edge B.

Although directed edges A and B have common edges (that is, vertex overlaps) in the target three-dimensional model, different start and end vertexes exist in the lightmap.

However, it is precisely because a vertex that is originally overlapped in the target three-dimensional model is split in the lightmap, a commonly known "seam problem" is caused, and a visual problem of discontinuous light transition shown in the block area in FIG. 1 is generated. Therefore, pixel location information of pixels corresponding to the four vertexes is obtained for each group of seam edges.

After the pixel location information of the pixels corresponding to each of the four vertexes is obtained, the terminal may calculate, based on the pixel location information of the pixels corresponding to each of the four vertexes, a pixel sampling quantity corresponding to the group of seam edges. Because two directed edges in a group of seam edges need to be separately sampled during sampling, the terminal can determine a pixel sampling quantity based on the following steps: acquiring an edge length of a directed edge in any group of seam edges and an edge length of a reverse edge of the directed edge in the group of seam edges; and determine a value obtained by multiplying a maximum value of the edge length of the directed edge and the edge length of the reverse edge by a sampling quality parameter, as the pixel sampling quantity.

In the foregoing process, pixel information of a target pixel that forms a seam edge can be collected as many as possible by using a smaller pixel sampling quantity, which has relatively high sampling quality, where the pixel information of each target pixel includes at least pixel location information of the target pixel and light color information of the target pixel (for example, pixel values of each of RGB channels). In some embodiments, alternatively, a value obtained by adding the edge length of the directed edge and the edge length of the reverse edge may be multiplied by a sampling quality parameter to obtain the pixel sampling quantity, so that final sampling quality can be improved by improving the sampling density.

In some embodiments, the terminal may separately obtain pixel sampling quantities of two directed edges (denoted as SampleCount), where a pixel sampling quantity of the directed edge A is equal to an edge length of the directed edge A, denoted as SampleCountA=Length (EndPosA−StartPosA), and a pixel sampling quantity of the directed edge B is equal to an edge length of the directed edge B (that is, a reverse edge of the directed edge A), denoted as SampleCountB=Length (EndPosB−StartPosB), and a total pixel sampling quantity of a group of seam edges formed by the two directed edges is SampleCount=Max (SampleCountA, SampleCountB)*SampleQuantity, where SampleQuantity is a sampling quality parameter passed in by the bake parameter of the editor.

After determining the pixel sampling quantity in a group of seam edges, the terminal may determine the target pixel in the following manner: determining an iteration step of a sampling process, that is, an iteration step of pixel sampling, according to the pixel location information and the pixel sampling quantity; performing pixel sampling based on the iteration step by using a pixel corresponding to any vertex as a start point; and using the sampling point determined based on the iteration step as the target pixel, that is, acquiring a sampling point determined in the pixel sampling as the target pixel.

In some embodiments, the directed edge A is used as an example. The terminal can acquire, according to pixel location information StartPosA and EndPosA of two vertexes of the directed edge A, a pixel (a pixel to be sampled, referred to as a sampling point) spanned by the directed edge A in the lightmap, and record the sampling point in the pixel list.

Optionally, to avoid redundant calculation, when a sampling point is recorded in the pixel list, a search de-duplication principle may be followed.

In some embodiments, a manner of acquiring the sampling point is as follows: The terminal acquires a step that is to be iterated on Samplecount, and Step=(EndPosA−StartPosA)/SampleCount. Then, cyclic iteration is performed from 0 to SampleCount, and an iteration index is recorded as StepIndex (equivalent to the sampling quantity of times). For any iteration process, pixel coordinates CoveragePixel=StartPosA+Step*StepIndex of a sampling point in a current iteration process may be queried for whether pixel information of a corresponding location has been recorded in a data set SeamTexels of pixel information. If it is not recorded, pixel location coordinates and light color information of the current sampling point are added to the SeamTexels. If it is recorded, next sampling is performed. In this embodiment of this application, only an iterative sampling process of the directed edge A is used as an example for description, and a similar operation may be performed on the directed edge B corresponding to the directed edge A. Details are not described herein again.

304. The terminal updates the target pixel to obtain a repaired lightmap, a texture of the seam edge in the repaired lightmap being continuous.

A texture of the pixel corresponding to the seam edge and a texture of a neighboring point in the repaired lightmap are continuous, that is, a texture in the repaired lightmap is continuous.

Step 304: The terminal updates an initial pixel value of the target pixel in the lightmap to obtain a repaired lightmap.

In some embodiments, before updating the target pixel, the terminal needs to solve the to-be-updated pixel value of the target pixel. Optionally, the terminal constructs a first matrix and a second matrix based on the pixel information of the target pixel; and acquire a third matrix based on the first matrix and the second matrix, the third matrix being used for indicating a to-be-updated pixel value of the target pixel. After acquiring the to-be-updated pixel value of the target pixel, the terminal may update the target pixel from the initial pixel value to the to-be-updated pixel value based on the third matrix, to obtain the repaired lightmap.

The first matrix is used for indicating pixel information of a directed edge and a reverse edge of the target pixel in a group of seam edges, that is, the first matrix is used for indicating an initial pixel value of a neighboring point of the target pixel in the lightmap and a bake result coefficient of the target pixel, and the second matrix is used for indicating an initial pixel value of the target pixel in the lightmap.

In some embodiments, when solving the third matrix, the terminal may construct a system of linear equations according to the first matrix and the second matrix. This is because when the target pixel is updated in the lightmap, pixel values of the RGB channels generally need to be updated. Therefore, three systems of linear equations may be separately constructed for the RGB channels, and finally, a to-be-updated pixel value of each channel may be acquired. Any color channel is used as an example. When a system of linear equations is constructed, the third matrix is used as an unknown number to construct a system of linear equations $Ax=b$, where A represents the first matrix, b represents the second matrix (because a quantity of columns is 1, it is equivalent to a column vector), and x represents the third matrix (which is also a to-be-solved unknown number). Next, the third matrix may be obtained by means of solving by using some systems of equations.

Optionally, the terminal processes the first matrix and the second matrix based on a conjugate gradient method, to obtain the third matrix. The conjugate gradient method is a data processing manner in which conjugation is combined with a fastest descent method. After the systems of linear equations are constructed by using the first matrix and the second matrix, initial pixel values of the target pixel on the RGB channels are separately iterated, so that the to-be-updated pixel values of the target pixel on the RGB channels can be outputted. The conjugate gradient method has a relatively fast solution speed and a small data storage amount for the third matrix, so that an acquiring rate of the third matrix can be increased.

When the conjugate gradient method is used for solve the Ax=b system of equations, it needs to be ensured that the first matrix A is a positive-definite matrix. A process of proving that the first matrix A is a positive-definite matrix is shown herein: Ax=b is equivalent to $A^T Ax = A^T b$, where $A^T$ represents a transpose matrix of the first matrix A. Because $(BA)^T = A^T B^T$, $B = A^T$ is substituted into the foregoing formula, to obtain $(A^T A)^T = A^T A$, which meets the definition of a symmetric matrix. Therefore, $A^T A$ is a symmetric matrix. Because coefficients in the first matrix A are positive decimals, the first matrix A is a positive-definite matrix, a transpose matrix $A^T$ of the first matrix A is also a positive-definite matrix, and a matrix $A^T A$ obtained by multiplying the two is also a positive-definite matrix, that is, $A^T A$ is a positive-definite matrix.

On the basis of ensuring that the first matrix A is a positive-definite matrix, the conjugate gradient method may be used for solving the system of linear equations Ax=b of any channel. In some embodiments, a quantity of rows of the first matrix A is a first target quantity m, and a quantity of columns is a second target quantity n, that is, the first matrix A is a matrix of m rows and n columns. The first target quantity m is a value (m=r0+r1) obtained by adding the sampling quantity r0 of the seam edge to the quantity r1 of the target pixels, where the sampling quantity r0 of the seam edge refers to a quantity of sampling groups of neighboring points of the target pixels, and a sampling process of neighboring points is described below, and details are not described herein again. The second target quantity n is a quantity r1 (n=r1) of the target pixels, a quantity of rows of the second matrix b is the first target quantity m, and a quantity of columns of the second matrix is one.

In some embodiments, because a sampling quantity of one group of seam edges may be represented as SampleCount, a sampling quantity r0=ΣSampleCountForEverySeamPair of all seam edges is recorded in SeamTexels in all pixel information of the target pixel in step 202. That is, the quantity of target pixels r1=Count(SeamTexels). In other words, r1 is a quantity of elements in SeamTexels.

Optionally, in the first r0 rows of the first matrix A, only eight elements in each row are non-zero decimals, and other elements are all 0s. In addition, because a quantity n of columns of the first matrix A is generally large, it can be learned that a quantity of zero elements in the first matrix A is far greater than a quantity of non-zero elements, that is, a value proportion of non-zero elements to all elements in the first matrix A is less than a proportion threshold, and the first matrix A belongs to a sparse matrix. Each row includes eight non-zero elements because a bilinear difference method is generally used for determining pixel information of a sampling point in a lightmap. For example, a location point on a seam edge of the target three-dimensional model is unwrapped into a pair of target pixels in the lightmap. That is, a location point in the seam edge corresponds to a pair of target pixels in the lightmap. In a pixel value repair process, each target pixel in the pair of target pixels needs to be used as a sampling point. It is assumed that four neighboring pixels (a neighboring pixel is a pixel around the sampling point) are sampled for each sampling point, and for each pair of target pixels, a group of eight neighboring pixels can be sampled, and eight non-zero pixel coefficients are calculated based on pixel location information and light color information of the eight neighboring pixels. For example, four pixels (that is, neighboring points) around a sampling point need to be interpolated separately. Because a seam edge needs to interpolate data that is distributed on a directed edge and a reverse edge on two edges of a seam, four pixels (that is, neighboring points) around a sampling point on a corresponding edge of the seam edge need to be considered. Therefore, each row includes eight non-zero coefficients.

Figure 4:
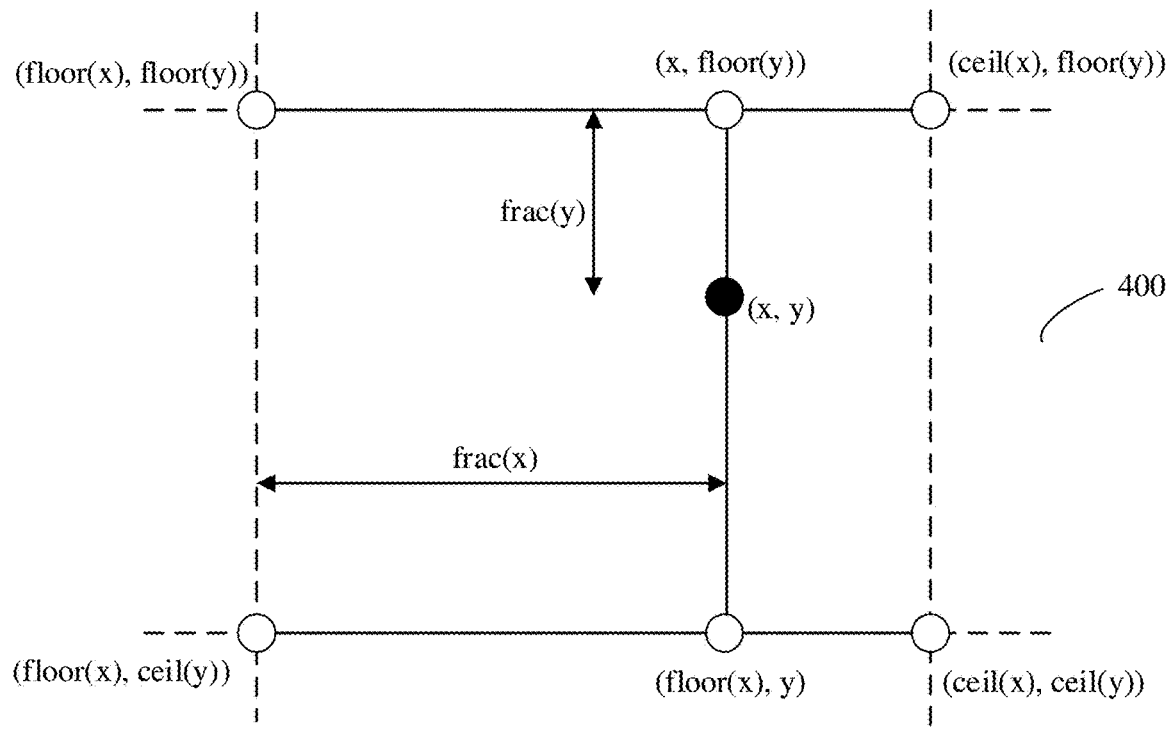
FIG. 4 is a schematic principle diagram of acquiring a non-zero coefficient according to an embodiment of this application.

In an example, FIG. 4 is a schematic principle diagram of acquiring a non-zero coefficient according to an embodiment of this application. A manner of acquiring eight non-zero coefficients in each row of the first matrix A is shown in FIG. 4. Referring to 400, it is assumed that pixel coordinates of the sampling point are (x, y), a value obtained by rounding down to x is denoted by floor(x), and a value obtained by rounding up to x is denoted by ceil(x). Similarly, a value obtained by rounding down to y is denoted by floor(y), and a value obtained by rounding up to y is denoted by ceil(y). In this way, four pixels around the sampling point (x, y) may be determined: (floor(x), floor(y)), (ceil(x), floor(y)), (floor(x), ceil(y)), (ceil(x), ceil(y)).

Based on the foregoing four pixels, four non-zero coefficients corresponding to (x, y) on a single directed edge can be determined based on bilinear interpolation as follows:

$$a0 = (1 - \text{frac}(x)) * (1 - \text{frac}(y));$$

$$a1 = \text{frac}(x) * (1 - \text{frac}(y));$$

$$a2 = (1 - \text{frac}(x)) * \text{frac}(y);$$

$$a3 = \text{frac}(x) * \text{frac}(y).$$

frac(x) is a difference between x and floor(x), and frac(y) is a difference between y and floor(y).

The terminal may acquire, in a similar manner, another four non-zero coefficients on the reverse edge of the directed edge in a group of seam edges, denoted as b0, b1, b2, and b3, and the symbol is reversed. Next, a0—a3 and b0—b3 may be used as eight non-zero coefficients in the first matrix A in a row corresponding to the sampling point.

After the foregoing process is repeatedly executed, all non-zero coefficients in the first r0 rows of the first matrix A may be constructed based on the bilinear interpolation method, and all remaining coefficients are filled by using 0s. For the last r1 row of the first matrix A, a matrix in which λ is a coefficient may be used. In each row, only a column in which a sampling point is located has a value of λ, and remaining terms are all 0s, where λ is a decimal (that is, a bake result coefficient) that is in a range [0, 1] and that is entered by an editor of a rendering engine, and may be customized by a person skilled in the art, or may be set by using a default value, for example, 0.5.

In the foregoing process, a matrix coefficient of the first matrix A is determined based on bilinear interpolation, and the first matrix A can be conveniently and quickly constructed. In some embodiments, the matrix coefficient of the first matrix A may also be determined in a manner such as double cubic interpolation, which can improve sampling accuracy.

In some embodiments, the second matrix b is a column vector whose rows are m. Optionally, a value of b in the first r0 rows in the second matrix b is 0, and a value of b in the second r1 row is a value of an original pixel (that is, an initial pixel value of a target pixel) in the lightmap. Generally, an initial pixel value of each target pixel in each of the three channels is separately recorded in the lightmap according to RGB channels. Therefore, three second matrix b of each of the three channels may be constructed, and therefore, three systems of linear equations in a form of Ax=b may be constructed.

Using a system of linear equations Ax=b of any channel as an example, in a process of acquiring the third matrix x based on the first matrix A and the second matrix b, the terminal first converts Ax=b into a $A^T Ax = A^T b$ form, and then determines the third matrix x based on the conjugate gradient method, that is, iteratively solves the initial pixel value of the target pixel on the channel, and finally outputs the to-be-updated pixel value of the target pixel on the channel. A similar operation may be performed on another channel, and finally, the to-be-updated pixel values of the target pixel on the three channels of the RGB can be obtained. Details are not described herein.

The foregoing cyclic logic of the conjugate gradient method is as follows:

$$r_0 := b - Ax_0$$

$$p_0 := r_0$$

$$k := 0$$

repeat $$\alpha_k := \frac{r_k^T r_k}{p_k^T A p_k}$$

$$x_{k+1} := x_k + \alpha_k p_k$$

$$r_{k+1} := r_k - \alpha_k A p_k$$

if $r_{k+1}$ is sufficiently small, then exit loop $$\beta_k := \frac{r_{k+1}^T r_{k+1}}{r_k^T r_k}$$

$$p_{k+1} := r_{k+1} + \beta_k p_k$$

$$k := k + 1$$

end repeat

The result is $x_{k+1}$

In the cyclic logic, A is the first matrix (that is, the coefficient matrix of the system of linear equations), b is the second matrix (that is, the observation value of the system of linear equations in the observation data), k is the quantity of iterations, r is the prediction error of the current iterative process, p is the gradient of the third matrix x of the current iterative process, both α and β are iteration steps when the system of linear equations is solved, x0 is the initial pixel value of the target pixel in the lightmap, and a final output result $x_{k+1}$ is the to-be-updated pixel value of the target pixel in the lightmap.

The foregoing cyclic logic is a conjugate gradient descent algorithm. First, a prediction error $r_0$, a gradient $p_0$, and a quantity k of iterations are initialized. Then, iteration steps $\alpha_k$ and $\beta^k$, a gradient $p_{k+1}$, a prediction value $x_{k+1}$, and a prediction error $r_{k+1}$ of a current iteration process are iteratively calculated based on the foregoing formulas, until the prediction error $r_{k+1}$ is sufficiently small (for example, less than an error threshold), a loop is exited, and a predicted value $x_{k+1}$ of the last iteration process is outputted as the to-be-updated pixel value of the target pixel.

In the foregoing process, the conjugate gradient method is used as an example to show the process of acquiring the third matrix x based on the first matrix A and the second matrix b. A seam problem existing on a seam edge can be automatically repaired after the seam edge is automatically identified. As a result, a person skilled in the art needs to manually and repeatedly troubleshoot the seam problem in the lightmap after a light rendering instruction is triggered. Therefore, a person skilled in the art can concentrate on a development design work, thereby greatly reducing a labor resource used for repairing a seam problem in image rendering, and greatly improving image rendering efficiency.

In some embodiments, the terminal may also process the first matrix A and the second matrix b based on the least square method to obtain the third matrix x, so as to reduce a calculation amount and improve calculation efficiency of the process of acquiring the third matrix x, or process the first matrix A and the second matrix b based on the Cholesky method to obtain the third matrix x, so as to improve calculation accuracy of the process of acquiring the third matrix x.

All of the above optional technical solutions can be combined randomly to form optional embodiments of the present disclosure. Details are not described herein again.

According to the method provided in this embodiment of this application, a seam edge of a target three-dimensional model is automatically identified, and then a to-be-repaired target pixel is automatically located in a lightmap of the target three-dimensional model. These target pixels are pixels corresponding to an edge line on which a texture is discontinuous on the seam edge. Therefore, a pixel value of the target pixel is automatically updated, and a repaired lightmap is finally outputted, so that automatic identification and automatic repair of a seam problem can be completed by one click, and a labor resource used for searching and repairing the seam problem in an image rendering process is greatly reduced, thereby reducing rendering time consumption and improving rendering efficiency.

Figure 5:
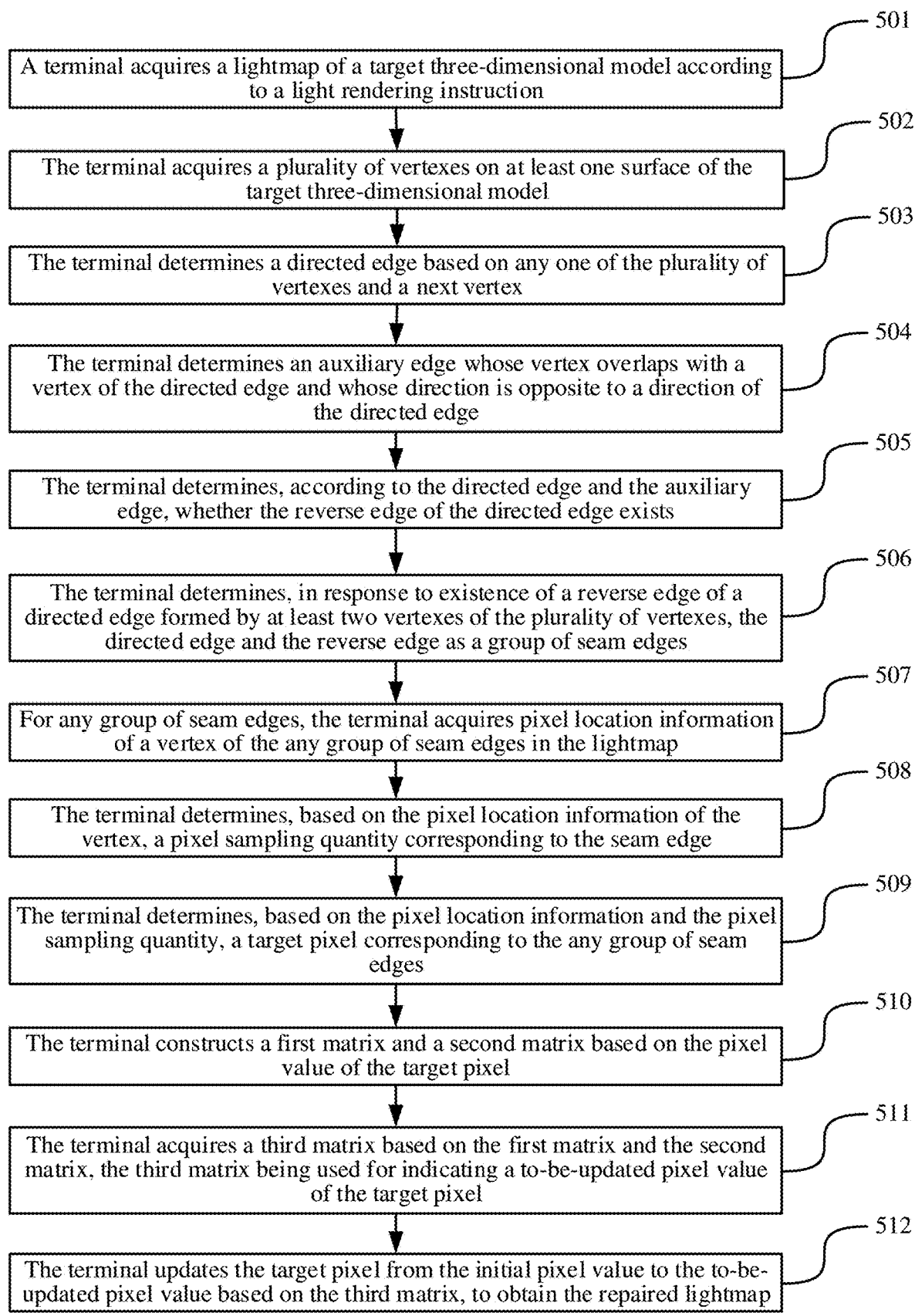
FIG. 5 is a flowchart of an image rendering method according to an embodiment of this application.

FIG. 5 is a flowchart of an image rendering method according to an embodiment of this application. Referring to FIG. 5, the method is applied to a terminal and includes the following steps:

501. A terminal acquires a lightmap of a target three-dimensional model according to a light rendering instruction.

The target three-dimensional model is a three-dimensional model to be rendered this time. The target three-dimensional model may correspond to at least one object. For example, the target three-dimensional model is a three-dimensional model of a single object, or the target three-dimensional model is a three-dimensional model of a virtual scenario formed by a plurality of objects. Content of the target three-dimensional model is not specifically limited in this embodiment of this application.

Step 501 is that the terminal acquires the lightmap of the target three-dimensional model in response to the light rendering instruction. Similar to step 301, details are not described herein again.

502. The terminal acquires a plurality of vertexes on at least one surface of the target three-dimensional model.

Optionally, the terminal acquires mesh information of the target three-dimensional model based on bake task information of the target three-dimensional model. Bake is a process of acquiring the lightmap based on model data of the target three-dimensional model. Therefore, the bake task information is task information created by the terminal based on a light rendering instruction. The mesh information includes vertex information, normal information, UV coordinates, triangle surface information, and the like in each surface. The triangle surface herein refers to a model surface uniquely determined by three vertexes. Then, the terminal may acquire a plurality of vertexes on at least one surface of the target three-dimensional model from the mesh information.

503. The terminal determines a directed edge based on any one of the plurality of vertexes and a next vertex.

In some embodiments, before determining the directed edge, the terminal may further perform the following initialization step: creating a set (denoted as Seams) that is used for recording two directed edge pairs, where each element in the set is a pair of opposite directed edges (the directed edge is denoted as VertexEdge and the auxiliary edge is denoted as ReversedEdge), and the auxiliary edge herein is an edge constructed based on the directed edge, which is not necessarily a real directed edge in the target three-dimensional model, and initializes Seams as a null set.

In addition, a directed edge set is created, and the directed edge set is used for recording a real directed edge in the target three-dimensional model. Optionally, the directed edge set is a data structure such as a dictionary, an array, a list, a queue, and a stack. In an example, the directed edge set is a dictionary set, denoted as EdgeMap, the dictionary set is a key-value stored data structure, a Key value is a directed edge, and a Value includes normal line information and UV coordinates of two vertexes of the directed edge.

In the foregoing process, the directed edge pair set Seams and the dictionary set EdgeMap are initialized, so that traversal recognition is quickly performed in a process of automatically identifying a seam edge, thereby accelerating a speed of identifying the seam edge and improving efficiency of identifying the seam edge.

After the directed edge pair set Seams and the dictionary set EdgeMap are created, the terminal traverses each surface of the target three-dimensional model. For example, each surface is a triangular surface. For any triangular surface, three vertexes in the triangular surface are traversed. In any traversal process, a directed edge VertexEdge is generated according to a current vertex and a next vertex of the current vertex.

504. The terminal determines an auxiliary edge whose vertex overlaps with a vertex of the directed edge and whose direction is opposite to a direction of the directed edge.

In the foregoing process, after generating the directed edge VertexEdge based on the current vertex and the next vertex, the terminal creates the auxiliary edge ReversedEdge whose direction is opposite to the direction of the directed edge VertexEdge by using two vertexes of the directed edge VertexEdge unchanged, that is, obtains an auxiliary edge ReversedEdge whose direction is opposite to the direction of the directed edge VertexEdge and their vertexes overlap. The auxiliary edge herein is an edge constructed based on a directed edge, and is not necessarily a real directed edge in the target three-dimensional model. The following step 505 needs to be used for determining whether a directed edge common with the auxiliary edge exists. If the directed edge VertexEdge exists, it indicates that a corresponding reverse edge exists, and a seam problem occurs in this case.

505. The terminal determines, according to the directed edge and the auxiliary edge, whether the reverse edge of the directed edge exists.

Optionally, in event that the auxiliary edge is another directed edge, the terminal determines the auxiliary edge as the reverse edge of the directed edge. For example, in event that the terminal queries the directed edge set of the target three-dimensional model for an edge same as the auxiliary edge (that is, there is an edge same as the auxiliary edge), in event that an edge that is the same as the auxiliary edge is found in the directed edge set of the target three-dimensional model, the terminal determines that the reverse edge of the directed edge exists, and determines the auxiliary edge as the reverse edge of the directed edge. Otherwise, in event that an edge that is the same as the auxiliary edge is not found in the directed edge set of the target three-dimensional model, the terminal adds the directed edge to the directed edge set, and performs a cyclical process of traversing a vertex of the current surface. If the current vertex is the last vertex of the current surface, the first vertex of a next surface continues to be traversed.

In some embodiments, in the created dictionary set EdgeMap, the terminal searches for whether data corresponding to the auxiliary edge ReversedEdge exists. If data corresponding to the auxiliary edge ReversedEdge exists in the dictionary set EdgeMap, it indicates that a seam problem occurs. The seam edge is a group of directed edge pairs (VertexEdge and RervsedEdge) formed by the directed edge and the reverse edge, and the directed edge pair (VertexEdge and RervsedEdge) is inserted into the directed edge pair set Seams. Otherwise, if no corresponding data exists in the dictionary set EdgeMap, it indicates that there is no seam problem on the directed edge VertexEdge, and the directed edge VertexEdge is inserted into the dictionary set EdgeMap, to continue to traverse the next vertex in the current surface, and cyclically perform the foregoing process until each vertex in each surface is traversed and a final directed edge pair set is returned.

In some embodiments, when determining whether data corresponding to the auxiliary edge ReversedEdge of the directed edge exists in the dictionary set EdgeMap, the terminal follows the following two determining principles. If a target directed edge exists in the dictionary set EdgeMap, (1) UV coordinates of the target directed edge are the same as those of the auxiliary edge ReversedEdge. (2) The angle between the normal of the auxiliary edge ReversedEdge and the two vertexes of the target directed edge is less than an angle threshold, which indicates that the target directed edge and the auxiliary edge ReversedEdge are on the same edge (that is, the two edges overlap), and indicates that a seam problem occurs. The angle threshold of the seam in the editor may be set to normalcosthreadhold.

In the foregoing process, in event that an edge that is the same as the auxiliary edge ReversedEdge is found in the directed edge set EdgeMap of the target three-dimensional model, it is determined that a reverse edge exists for the directed edge VertexEdge. In event that the same edge as the auxiliary edge ReversedEdge cannot be found in the directed edge set of the target three-dimensional model EdgeMap, the directed edge VertexEdge is added to the directed edge set EdgeMap. In this way, in a cyclic process, a group of directed edge pairs that have a reverse edge can be identified and added to the directed edge pair set Seams, and the directed edge pair set Seams is used as a return value after final traversal is completed. In addition, a directed edge that does not have a reverse edge can be inserted into the directed edge set EdgeMap, and a quantity of elements in the directed edge set EdgeMap that need to be identified in a next cyclic process can be expanded, thereby improving accuracy of identifying a seam edge.

506. The terminal determines, in response to existence of a reverse edge of a directed edge formed by at least two vertexes of the plurality of vertexes, the directed edge and the reverse edge as a group of seam edges.

In the foregoing process, after it is detected that any directed edge has a reverse edge, the directed edge and the reverse edge are determined as a group of seam edges. After each directed edge in each surface of the target three-dimensional model is traversed, if a seam problem exists, at least one group of seam edges can be determined. If no seam problem exists, that is, no reverse edge exists for any directed edge, the terminal reports no seam problem.

In some embodiments, in the traversal process of step 505, once a group of seam edges is detected, the detected group of seam edges is inserted into the directed edge pair set Seams, and after the traversal is completed, the directed edge pair set Seams returned by the cyclic logic is directly invoked, so that each group of seam edges of the target three-dimensional model can be read. A group of seam edges includes a directed edge and a reverse edge of the directed edge, and vertexes between the directed edge and the reverse edge overlap and have opposite directions.

In steps 502-506, the terminal acquires a seam edge of the target three-dimensional model, the seam edge being an edge line that is on the same surface in the target three-dimensional model and that is discontinuously textured in the lightmap. Optionally, in this embodiment of this application, the foregoing process of acquiring the seam edge is performed after the terminal obtains the lightmap through rendering. In this way, the seam edge of the rendered lightmap can be directly fitted, so that a better seam repair effect can be obtained. In some embodiments, before the rendering stage, the seam edge in the target three-dimensional model is automatically identified. Then, in the light sampling stage, pixel difference calculation is performed in a nearby world space, so that a to-be-updated pixel value whose texture transformation is smoother is fitted to the target pixel in the rendering stage, so that a repaired lightmap is directly obtained after the light rendering.

507. For any group of seam edges, the terminal acquires pixel location information of a vertex of the any group of seam edges in the lightmap.

In step 507, that is, for any group of the seam edges, pixel location information of a pixel corresponding to a vertex of the seam edge in the lightmap is acquired.

In the foregoing process, after determining each group of seam edges, the terminal may collect pixel information of pixels that form each group of seam edges in the lightmap. Optionally, pixel information of a pixel includes pixel location information (that is, location coordinates) and pixel color information (that is, light color information) of the pixel, and a data set formed by pixel information of a pixel forming each group of seam edges is denoted as SeamTexels.

In some embodiments, the terminal traverses each group of seam edges (a group of seam edges includes a pair of directed edges A and B in opposite directions) in each directed edge pair set Seams, and pixel location information of pixels corresponding to vertexes of the directed edges A and B in the lightmap can be read from SeamTexels: (StartPosA, EndPosA, StartPosB, EndPosB).

StartPosA is pixel location information of the pixel corresponding to the start vertex of the directed edge A, EndPosA is pixel location information of the pixel corresponding to the end vertex of the directed edge A, StartPosB is pixel location information of the pixel corresponding to the start vertex of the directed edge B, and EndPosB is pixel location information of the pixel corresponding to the end vertex of the directed edge B.

Although directed edges A and B have common edges (that is, vertex overlaps) in the target three-dimensional model, different start and end vertexes exist in the lightmap. However, it is precisely because a vertex that is originally overlapped in the target three-dimensional model is split in the lightmap, a commonly known "seam problem" is caused, and a visual problem of discontinuous light transition shown in the block area in FIG. 1 is generated. Therefore, pixel location information of four vertexes is obtained for each group of seam edges.

508. The terminal determines, based on the pixel location information of the vertex, a pixel sampling quantity corresponding to the seam edge.

In step 508, the terminal determines, based on the pixel location information, the pixel sampling quantity corresponding to the seam edge.

Optionally, the terminal acquires the edge length of the directed edge in the any group of seam edges and the edge length of the reverse edge of the directed edge, and determines, as the pixel sampling quantity, the value obtained by multiplying the maximum value of the edge length of the directed edge and the edge length of the reverse edge by using a sampling quality parameter.

In the foregoing process, pixel information related to the seam edge can be collected as much as possible by using a as small as possible pixel sampling quantity, which has relatively high sampling quality. In some embodiments, a value obtained by adding the edge length of the directed edge and the edge length of the reverse edge may be multiplied by a sampling quality parameter to obtain the pixel sampling quantity, so that final sampling quality can be improved by improving the sampling density.

In some embodiments, the terminal may separately obtain pixel sampling quantities of two directed edges (denoted as SampleCount), where a pixel sampling quantity of the directed edge A is equal to an edge length of the directed edge A, denoted as SampleCountA=Length (EndPosA−StartPosA), and a pixel sampling quantity of the directed edge B is equal to an edge length of the directed edge B (that is, a reverse edge of the directed edge A), denoted as SampleCountB=Length (EndPosB−StartPosB), and a total pixel sampling quantity of a group of seam edges formed by the two directed edges is SampleCount=Max (SampleCountA, SampleCountB)*SampleQuantity, where SampleQuantity is a sampling quality parameter passed in by the bake parameter of the editor.

509. The terminal determines, based on the pixel location information and the pixel sampling quantity, a target pixel corresponding to the any group of seam edges.

In some embodiments, the terminal may determine an iteration step of a sampling process, that is, an iteration step of pixel sampling, based on the pixel location information and the pixel sampling quantity; perform pixel sampling based on the iteration step by using a pixel corresponding to any vertex as a start point; and use the sampling point determined based on the iteration step as the target pixel, that is, acquire a sampling point determined in the pixel sampling as the target pixel.

The directed edge A is used as an example. The terminal can acquire, according to pixel location information StartPosA and EndPosA of two vertexes of the directed edge A, a pixel (a pixel to be sampled, referred to as a sampling point) spanned by the directed edge A in the lightmap, and record the sampling point in the pixel list. Optionally, to avoid redundant calculation, when a sampling point is recorded in the pixel list, a search de-duplication principle may be followed.

In some embodiments, a manner of acquiring the sampling point is as follows: The terminal acquires a step that is to be iterated on Samplecount, and Step=(EndPosA−StartPosA)/SampleCount. Then, cyclic iteration is performed from 0 to SampleCount, and an iteration index is recorded as StepIndex (equivalent to the sampling quantity of times). For any iteration process, pixel coordinates CoveragePixel=StartPosA+Step*StepIndex of a sampling point in a current iteration process may be queried for whether pixel information of a corresponding location has been recorded in a data set SeamTexels of pixel information. If it is not recorded, pixel location coordinates and light color information of the current sampling point are added to the SeamTexels. If it is recorded, next sampling is performed. In this embodiment of this application, only an iterative sampling process of the directed edge A is used as an example for description, and a similar operation may be performed on the directed edge B corresponding to the directed edge A. Details are not described herein again.

In steps 507-509, the terminal determines the target pixel in the lightmap based on the seam edge. In other words, in the lightmap, the terminal determines the target pixel corresponding to the seam edge. That is, the target pixel is a pixel corresponding to an edge line on the seam edge in which a texture is discontinuous. By using the following steps 510-512, an initial pixel value of the target pixel may be updated to fit the repaired lightmap.

510. The terminal constructs a first matrix and a second matrix based on a pixel value of the target pixel, the first matrix being used for indicating pixel information of the target pixel on a directed edge and a reverse edge in a group of seam edges, and the second matrix being used for indicating an initial pixel value of the target pixel in the lightmap.

That is, the first matrix is used for indicating an initial pixel value of a neighboring point of the target pixel in the lightmap and a bake result coefficient of the target pixel.

In some embodiments, a quantity of rows of the first matrix A is a first target quantity m, and a quantity of columns is a second target quantity n, that is, the first matrix A is a matrix of m rows and n columns. The first target quantity m is a value (m=r0+r1) obtained by adding the sampling quantity r0 of the seam edge to the quantity r1 of the target pixels, where the sampling quantity r0 of the seam edge refers to a quantity of sampling groups of neighboring points of the target pixels, and a sampling process of neighboring points is described below, and details are not described herein again. The second target quantity n is a quantity r1 (n=r1) of the target pixels, a quantity of rows of the second matrix b is the first target quantity m, and a quantity of columns of the second matrix is one.

Optionally, when solving the third matrix, the terminal may construct a system of linear equations according to the first matrix and the second matrix. This is because when the target pixel is updated in the lightmap, pixel values of the RGB channels generally need to be updated. Therefore, three systems of linear equations may be separately constructed for the RGB channels, and finally, a to-be-updated pixel value of each channel may be acquired. Any channel is used as an example. When a system of linear equations is constructed, the third matrix is used as an unknown number to construct a system of linear equations Ax=b, where A represents the first matrix, b represents the second matrix (because a quantity of columns is 1, it is equivalent to a column vector), and x represents the third matrix (which is also a to-be-solved unknown number). Next, the third matrix may be obtained by means of solving by using some systems of equations in the following step 511.

511. The terminal acquires a third matrix based on the first matrix and the second matrix, the third matrix being used for indicating a to-be-updated pixel value of the target pixel.

In some embodiments, the terminal processes the first matrix and the second matrix based on a conjugate gradient method, to obtain the third matrix; or the terminal processes the first matrix and the second matrix based on a least square method, to obtain the third matrix; or the terminal processes the first matrix and the second matrix based on the Cholesky decomposition method, to obtain the third matrix.

In this embodiment of this application, a conjugate gradient method is used as an example for solving the third matrix x. The conjugate gradient method is a data processing manner in which conjugation is combined with a fastest descent method. After the systems of linear equations are constructed by using the first matrix and the second matrix, initial pixel values of the target pixel on the RGB channels are separately iterated, so that the to-be-updated pixel values of the target pixel on the RGB channels can be outputted. The conjugate gradient method has a relatively fast solution speed and a small data storage amount for the third matrix, so that an acquiring rate of the third matrix can be increased.

When the conjugate gradient method is used for solve the Ax=b system of equations, it needs to be ensured that the first matrix A is a positive-definite matrix. A process of proving that the first matrix A is a positive-definite matrix is shown herein: Ax=b is equivalent to $A^T Ax=A^T b$, where $A^T$ represents a transpose matrix of the first matrix A. Because $(BA)^T=A^T B^T$, $B=A^T$ is substituted into the foregoing formula, to obtain $(A^T A)^T=A^T A$, which meets the definition of a symmetric matrix. Therefore, $A^T A$ a symmetric matrix. Because coefficients in the first matrix A are positive decimals, the first matrix A is a positive-definite matrix, a transpose matrix $A^T$ of the first matrix A is also a positive-definite matrix, and a matrix $A^T A$ obtained by multiplying the two is also a positive-definite matrix, that is, $A^T A$ is a positive-definite matrix.

On the basis of ensuring that the first matrix A is a positive-definite matrix, a system of linear equations Ax=b of any channel may be obtained by using the conjugate gradient method. Because a sampling quantity of one group of seam edges may be represented as SampleCount, a sampling quantity r0=ΣSampleCountForEverySeamPair of all seam edges is recorded in SeamTexels in all pixel information of the target pixel in step 202. That is, the quantity of target pixels r1=Count(SeamTexels). In other words, r1 is a quantity of elements in SeamTexels.

Optionally, in the first r0 rows of the first matrix A, only eight elements in each row are non-zero decimals, and other elements are all 0s. In addition, because a quantity n of columns of the first matrix A is generally large, it can be learned that a quantity of zero elements in the first matrix A is far greater than a quantity of non-zero elements, that is, a value proportion of non-zero elements to all elements in the first matrix A is less than a proportion threshold, and the first matrix A belongs to a sparse matrix. Each row includes eight non-zero elements because a bilinear difference method is generally used for determining pixel information of a sampling point in a lightmap. For example, a location point on a seam edge of the target three-dimensional model is unwrapped into a pair of target pixels in the lightmap. That is, a location point in the seam edge corresponds to a pair of target pixels in the lightmap. In a pixel value repair process, each target pixel in the pair of target pixels needs to be used as a sampling point. It is assumed that four neighboring pixels (a neighboring pixel is a pixel around the sampling point) are sampled for each sampling point, and for each pair of target pixels, a group of eight neighboring pixels can be sampled, and eight non-zero pixel coefficients are calculated based on pixel location information and light color information of the eight neighboring pixels. For example, four pixels a0-a3 (that is, neighboring points a0-a3) around a sampling point need to be interpolated separately. Because a seam edge needs to interpolate data that is distributed on a directed edge and a reverse edge on two edges of a seam, four pixels b0-b3 (that is, neighboring points b0-b3) around a sampling point on a corresponding edge of the seam edge need to be considered. Therefore, each row includes eight non-zero coefficients a0-a3 and b0-b3. A manner of acquiring the non-zero coefficients a0-a3 and b0-b3 is similar to that in step 304, and details are not described herein again. After the foregoing process is repeatedly executed, all non-zero coefficients in the first r0 rows of the first matrix A may be constructed based on the bilinear interpolation method, and all remaining coefficients are filled by using 0s.

Optionally, for the last r1 row of the first matrix A, a matrix in which $\lambda$ is a coefficient may be used. In each row, only a column in which a sampling point is located has a value of $\lambda$, and remaining terms are all 0s, where $\lambda$ is a decimal (that is, a bake result coefficient) that is in a range [0, 1] and that is entered by an editor of a rendering engine, and may be customized by a person skilled in the art, or may be set by using a default value, for example, 0.5.

In the foregoing process, a matrix coefficient of the first matrix A is determined based on bilinear interpolation, and the first matrix A can be conveniently and quickly constructed. In some embodiments, the matrix coefficient of the first matrix A may also be determined in a manner such as double cubic interpolation, which can improve sampling accuracy.

In some embodiments, the second matrix b is a column vector whose rows are m. Optionally, a value of b in the first r0 rows in the second matrix b is 0, and a value of b in the second r1 row is a value of an original pixel (that is, an initial pixel value of a target pixel) in the lightmap. Generally, an initial pixel value of each target pixel in each of the three channels is separately recorded in the lightmap according to RGB channels. Therefore, three second matrix b of each of the three channels may be constructed, and therefore, three systems of linear equations in a form of Ax=b may be constructed.

Using a system of linear equations Ax=b of any channel as an example, in a process of acquiring the third matrix x based on the first matrix A and the second matrix b, the terminal first converts Ax=b into a $A^T Ax=A^T b$ form, and then determines the third matrix x based on the conjugate gradient method, that is, iteratively solves the initial pixel value of the target pixel on the channel, and finally outputs the to-be-updated pixel value of the target pixel on the channel. A similar operation may be performed on another channel, and finally, the to-be-updated pixel values of the target pixel on the three channels of the RGB can be obtained. Details are not described herein.

A cyclic logic of the conjugate gradient method is similar to that in step 304, and details are not described herein again.

In the foregoing process, the conjugate gradient method is used as an example to show the process of acquiring the third matrix x based on the first matrix A and the second matrix b. A seam problem existing on a seam edge can be automatically repaired after the seam edge is automatically identified. As a result, a person skilled in the art needs to manually and repeatedly troubleshoot the seam problem in the lightmap after a light rendering instruction is triggered. Therefore, a person skilled in the art can concentrate on a development design work, thereby greatly reducing a labor resource used for repairing a seam problem in image rendering, and greatly improving image rendering efficiency.

In some embodiments, the terminal may also process the first matrix A and the second matrix b based on the least square method to obtain the third matrix x, so as to reduce a calculation amount and improve calculation efficiency of the process of acquiring the third matrix x, or process the first matrix A and the second matrix b based on the Cholesky method to obtain the third matrix x, so as to improve calculation accuracy of the process of acquiring the third matrix x.

512. The terminal updates the target pixel from the initial pixel value to the to-be-updated pixel value based on the third matrix, to obtain the repaired lightmap.

In the foregoing process, the terminal can read a to-be-updated pixel value of each target pixel from the third matrix. Then, in the lightmap, a location of each target pixel is located according to pixel coordinates of the target pixel. Then, at the location of each target pixel, an existing initial pixel value is updated to a to-be-updated pixel value provided by the third matrix, and after replacement, a repaired lightmap is outputted.

In steps 510-512, the terminal updates the initial pixel value of the target pixel in the lightmap to obtain the repaired lightmap, where the texture of the pixel corresponding to the seam edge in the repaired lightmap and the texture of the neighboring point are continuous, that is, a texture in the repaired lightmap is continuous. In the foregoing step, the pixel value is updated on the rendered lightmap, and smoothing processing is performed on a seam edge whose original texture is not smooth based on bilinear interpolation. A to-be-updated pixel value is calculated by using a system of linear equations constructed by means of solving, to update the initial pixel value of the target pixel. Finally, the lightmap whose seam problem is fixed is finally outputted. In this way, the seam problem can be identified and repaired by one click in a light rendering stage, and manual troubleshooting is not required by a person skilled in the art.

All of the above optional technical solutions can be combined randomly to form optional embodiments of the present disclosure. Details are not described herein again.

According to the method provided in this embodiment of this application, a seam edge of a target three-dimensional model is automatically identified, and then a to-be-repaired target pixel is automatically located in a lightmap of the target three-dimensional model. These target pixels are pixels corresponding to an edge line on which a texture is discontinuous on the seam edge. Therefore, a pixel value of the target pixel is automatically updated, and a repaired lightmap is finally outputted, so that automatic identification and automatic repair of a seam problem can be completed by one click, and a labor resource used for searching and repairing the seam problem in an image rendering process is greatly reduced, thereby reducing rendering time consumption and improving rendering efficiency.

Figure 6:
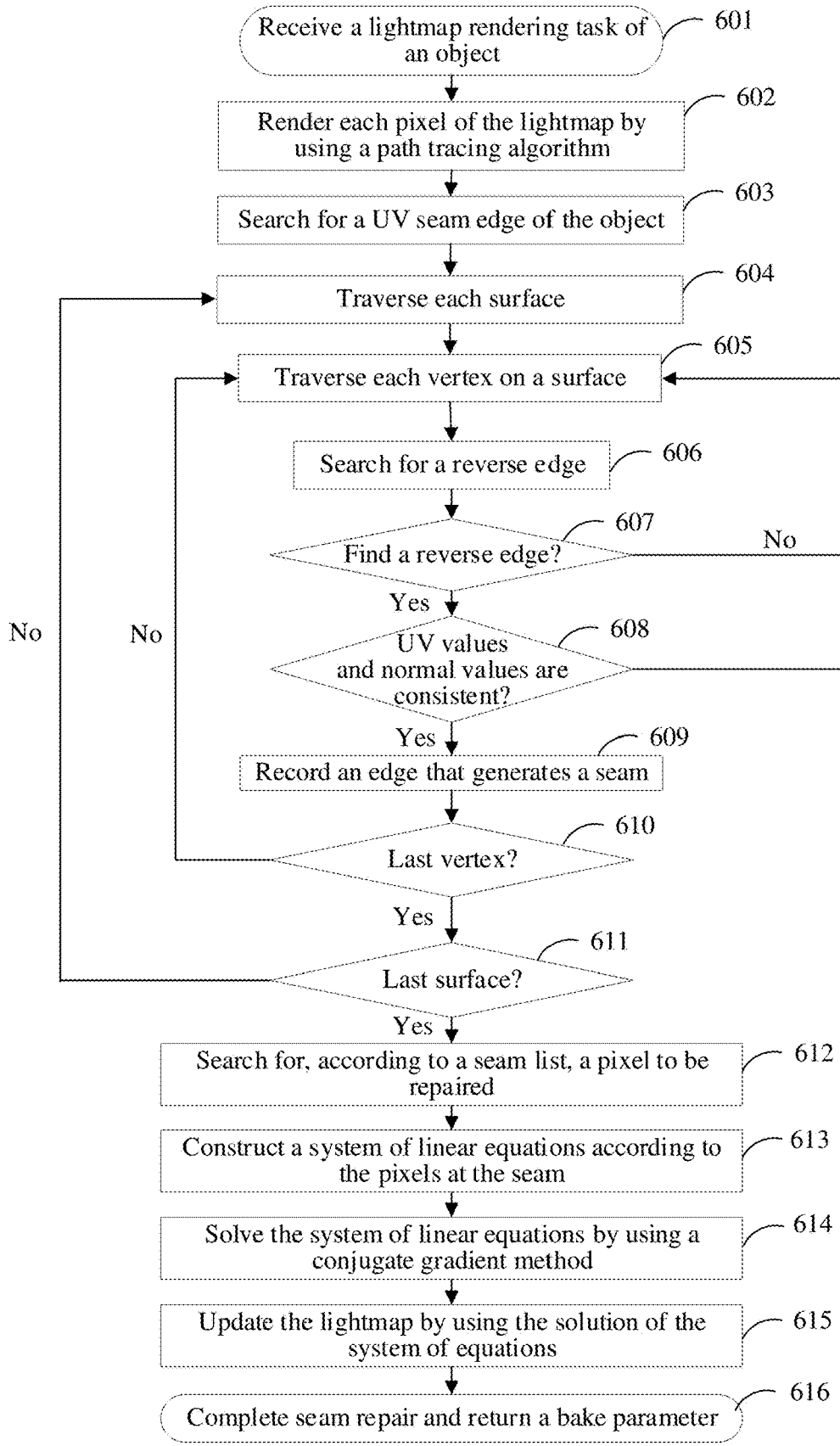
FIG. 6 is a principle flowchart of an image rendering method according to an embodiment of this application.

FIG. 6 is a flowchart of an image rendering method according to an embodiment of this application. Referring to FIG. 6, the method includes the following steps.

In step 601, a terminal receives a lightmap rendering task of an object.

In step 602, the terminal renders each pixel of the lightmap by using a path tracing algorithm.

In step 603, the terminal searches for a UV seam edge of the object.

In step 604, the terminal traverses each surface of the object.

In step 605, the terminal traverses each vertex on a current surface.

In step 606, the terminal searches for a reverse edge of a directed edge formed by the current vertex and a next vertex.

In step 607, the terminal determines whether a reverse edge is found. If a reverse edge is found, step 608 is performed; otherwise, if no reverse edge is found, step 605 is performed again.

In step 608, the terminal determines whether UV values and normal values of the auxiliary edge and the reverse edge are consistent. If the UV values and the normal values are consistent, step 609 is performed. Otherwise, if the UV values and the normal values are inconsistent, step 605 is performed again.

In step 609, the terminal records a group of directed edges that generate a seam.

In step 610, the terminal determines whether a current vertex is the last vertex of the current surface. If the current vertex is the last vertex of the current surface, step 611 is performed. Otherwise, if the current vertex is not the last vertex of the current surface, step 605 is performed again.

In step 611, the terminal determines whether the current surface is the last surface of the object. If the current surface is the last surface of the object, step 612 is performed. If the current surface is not the last surface of the object, step 604 is performed again.

In step 612, the terminal searches for, according to a seam list, a pixel to be repaired (that is, a target pixel).

In step 613, the terminal constructs a system of linear equations according to the pixels at the seam.

In step 614, the terminal solves the system of linear equations by using a conjugate gradient method.

In step 615, the terminal updates the lightmap by using the solution of the system of equations.

In step 616, the terminal completes seam repair and returns a bake parameter to a front-end editor.

In this embodiment of this application, after the lightmap is rendered, an automatic UV seam detection function is implemented in steps 603-611, and a seam edge existing in the lightmap can be automatically queried. Therefore, time consumption of manual troubleshooting is greatly avoided, efficiency of identifying the seam edge is improved, and a labor resource is saved. In steps 612-616, an automatic UV seam repair function is implemented, and automatic repair can be performed on the identified UV seam edge. A repair manner is to separately solve three systems of linear equations of RGB channels. A to-be-updated pixel value may be obtained in a manner such as the conjugate gradient method, the least square method, and the Cholesky decomposition method. In addition, the existing pixel value in the lightmap is replaced, to implement automatic seam problem identification and repair by one click.

Figure 7:
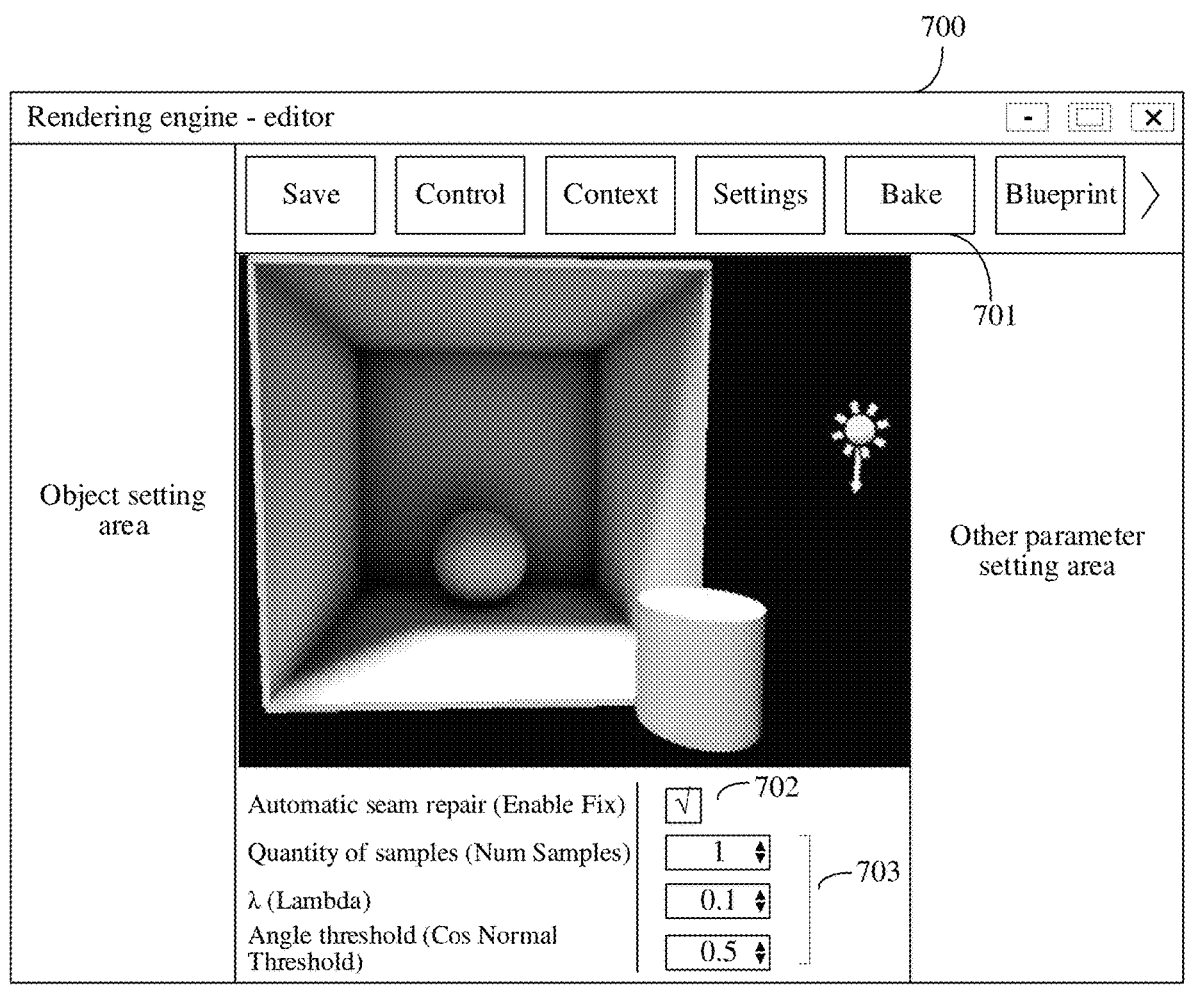
FIG. 7 is a schematic diagram of an operation interface of a rendering engine according to an embodiment of this application.

FIG. 7 is a schematic diagram of an operation interface of a rendering engine according to an embodiment of this application. FIG. 7 shows an operation interface 700 of a rendering engine. A bake start button 701 is provided on the operation interface 700. For example, the bake start button 701 is "Dawn". After a user triggers the bake start button 701, a terminal receives a light rendering instruction, and performs offline global light rendering on a target three-dimensional model imported in the rendering engine. In the operation interface 700, further a seam repair switch 702 and a bake parameter setting area 703 are provided. The user may control, by using the seam repair switch 702, whether an automatic UV seam repair function needs to be enabled. If the automatic UV seam repair function is enabled, a quantity of samples that need to be repaired in the bake parameter setting area 703, for example, Num Samples, λ (Lambda, a bake result coefficient of the last r1 rows of the first matrix A), and an angle threshold (Cos Normal Threshold, used for determining whether the auxiliary edge and the reverse edge share the same edge), in an example, Num Samples=1, λ=0.1, and Cos Normal Threshold=0.5. When rendering the lightmap, the terminal needs to set lightmap resolution of each object to provide UV information of each vertex of the object in the lightmap, normal line and tangent information thereof in a world coordinate system, and the like. After the user triggers the bake start button 701, the rendering engine sends a bake task of each object to a baker, where the bake task includes detailed mesh information of the bake object (vertex, normal, triangular surface, and UV coordinates of the lightmap), and the baker performs light rendering according to the bake task.

In an example scenario, offline rendering of game scenario data is used as an example. Currently, in game development, more and more large scenarios are developed in a large scenario or world. Basically, there are tens of thousands of objects in a virtual scenario, and one object is corresponding to one target three-dimensional model. If a professional rendering engine such as Unreal Engine 4 (ue4) is used for performing a rendering task of a lightmap, at least several hours are needed. If a rendered lightmap has a seam problem, a technician needs to manually check and then adjust scenario data, and then perform baking again. In addition, not only a large amount of labor and material resources need to be consumed in a manual troubleshooting process, but also a large amount of time needs to be consumed in a large scenario, thereby bringing a large amount of labor costs and time costs. Based on the image rendering method in this embodiment of this application, automatic UV seam detection can be used for conveniently and automatically completing seam edge detection. In addition, automatic UV seam repair can be implemented. In a baking process, a technician is automatically assisted to complete repair of a seam problem, and a bake task can be highly efficiently completed.

Figure 8:
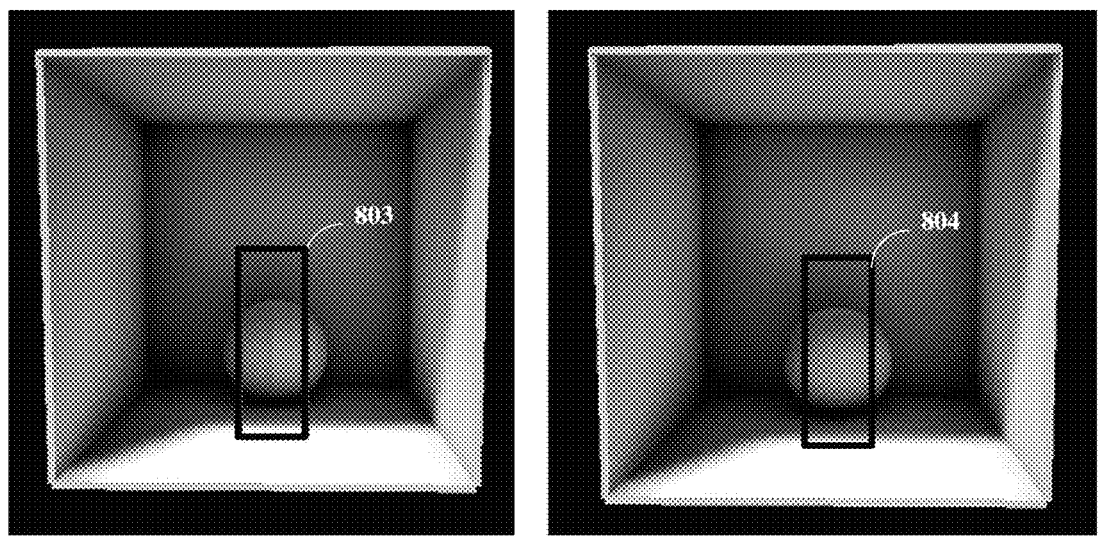
FIG. 8 is a comparison diagram before and after a seam problem of an image rendering method according to an embodiment of this application is repaired.

FIG. 8 is a comparison diagram before and after a seam problem of an image rendering method according to an embodiment of this application is repaired. As shown in FIG. 8, 801 shows a lightmap before the seam problem is repaired. It may be learned that a seam problem exists in a block area 803, and a case of a discontinuous texture on a smooth surface of a sphere is obvious. 802 shows a lightmap after the seam problem is repaired. It may be learned that a discontinuous texture abnormality is removed from a block area 804, so that light on the smooth surface of the sphere is also more smooth, that is, a seam problem in 801 of a discontinuous texture is obviously repaired in 802, and a visual effect of the lightmap is improved. After automatic seam identification and a seam repair algorithm of the lightmap are used, when a user performs offline global rendering, the seam problem in the lightmap can be repaired manually, which greatly reduces time and labor costs. This enables the user to concentrate on the artistic design of the scenario and helps efficiently develop the game.

In an example, it is assumed that in a large-scale world scenario, tens of thousands of objects are basically present. Even if 1% of the objects have a seam problem, hundreds of problems to be manually fixed occur. Assuming that a user can fix a problem in 1 hour, a total labor input of a scenario that needs to be fixed is 100 hours, and when the scenario changes and needs to be rendered again, the 100-hour labor input is needed again. However, by using the automatic UV seam identification and intelligent repair solution in this embodiment of this application, after each scenario changes, an investment in baking can be reduced by at least 100 hours compared with a conventional manual repair manner, and time saved may be several 100 hours with development iterations.

Figure 9:
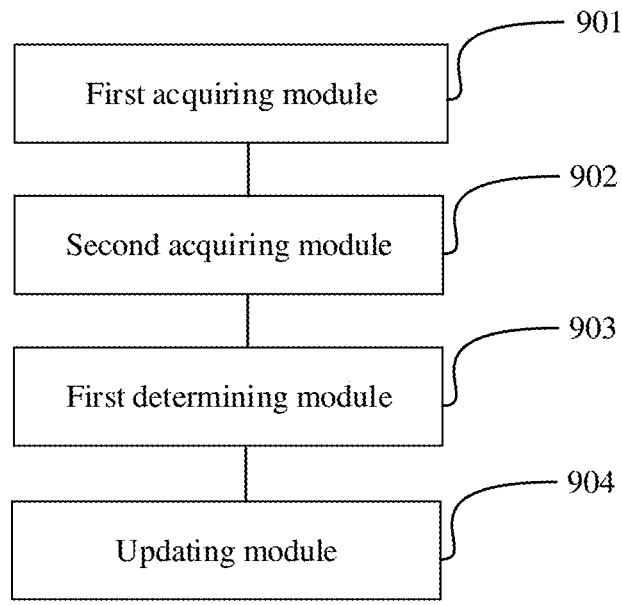
FIG. 9 is a schematic structural diagram of an image rendering apparatus according to an embodiment of this application.

FIG. 9 is a schematic structural diagram of an image rendering apparatus according to an embodiment of this application. Referring to FIG. 9, the apparatus includes:

a first acquiring module 901, configured to acquire a lightmap of a target three-dimensional model according to a light rendering instruction; that is, the first acquiring module 901 is configured to acquire a lightmap of a target three-dimensional model in response to a light rendering instruction;

a second acquiring module 902, configured to acquire a seam edge of the target three-dimensional model, the seam edge being an edge line that is on the same surface in the target three-dimensional model and that is discontinuously textured in the lightmap;

a first determining module 903, configured to determine a target pixel in the lightmap based on the seam edge; that is, the first determining module 903 is configured to determine, in the lightmap, a target pixel corresponding to the seam edge; and an updating module 904, configured to update the target pixel to obtain a repaired lightmap, a texture of the seam edge in the repaired lightmap being continuous; that is, the updating module 904 is configured to update the initial pixel value of the target pixel in the lightmap to obtain the repaired lightmap, the texture in the repaired lightmap being continuous.

According to the apparatus provided in this embodiment of this application, a seam edge of a target three-dimensional model is automatically identified, and then a to-be-repaired target pixel is automatically located in a lightmap of the target three-dimensional model. These target pixels are pixels corresponding to an edge line on which a texture is discontinuous on the seam edge. Therefore, a pixel value of the target pixel is automatically updated, and a repaired lightmap is finally outputted, so that automatic identification and automatic repair of a seam problem can be completed by one click, and a labor resource used for searching and repairing the seam problem in an image rendering process is greatly reduced, thereby reducing rendering time consumption and improving rendering efficiency.

In a possible implementation, a group of seam edges includes a directed edge and a reverse edge of the directed edge, and vertexes between the directed edge and the reverse edge overlap and have opposite directions; and The second acquiring module 902 is configured to:

acquire a plurality of vertexes on at least one surface of the target three-dimensional model; and determine, in response to existence of a reverse edge of a directed edge formed by at least two vertexes of the plurality of vertexes, the directed edge and the reverse edge as a group of seam edges.

In a possible implementation, based on the apparatus in FIG. 9, the apparatus further includes:

a second determining module, configured to determine a directed edge based on any one of the plurality of vertexes and a next vertex;

a third determining module, configured to determine an auxiliary edge whose vertex overlaps with a vertex of the directed edge and whose direction is opposite to a direction of the directed edge; and a fourth determining module, configured to determine, according to the directed edge and the auxiliary edge, whether the directed edge has the reverse edge. That is, the fourth determining module is configured to: determine the auxiliary edge as the reverse edge of the directed edge, wherein the auxiliary edge is another directed edge.

In a possible implementation, the fourth determining module is configured to:

in response to an edge being the same as the auxiliary edge ReversedEdge is found in the directed edge set EdgeMap of the target three-dimensional model, determine that a reverse edge exists for the directed edge VertexEdge, and determine the auxiliary edge as the reverse edge of the directed edge.

In some possible implementations, based on the apparatus in FIG. 9, the apparatus further includes an adding module, configured to:

add the directed edge to the directed edge set in response to the same edge as the auxiliary edge not being found in the directed edge set of the target three-dimensional model.

In a possible implementation, based on the apparatus in FIG. 9, the first determining module 903 includes:

a first acquiring unit, configured to acquire pixel location information of a pixel corresponding to a vertex of any group of seam edges in the lightmap;

a first determining unit, configured to determine a pixel sampling quantity of the any group of seam edges based on the pixel location information of the vertex; and a second determining unit, configured to determine, based on the pixel location information and the pixel sampling quantity, a target pixel corresponding to the any group of seam edges.

In a possible implementation, the second determining unit is configured to:

determine an iteration step of a sampling process, that is, an iteration step of pixel sampling, based on the pixel location information and the pixel sampling quantity;

perform pixel sampling based on the iteration step by using a pixel corresponding to any vertex as a start point; and use the sampling point determined based on the iteration step as the target pixel, that is, acquire a sampling point determined in the pixel sampling as the target pixel.

In a possible implementation, the first determining unit is configured to:

acquire an edge length of a directed edge in the any group of seam edges and an edge length of a reverse edge of the directed edge; and determine a value obtained by multiplying a maximum value of the edge length of the directed edge and the edge length of the reverse edge by a sampling quality parameter, as the pixel sampling quantity.

In a possible implementation, based on the apparatus in FIG. 9, the updating module 904 includes:

a construction unit, configured to construct a first matrix and a second matrix based on a pixel value of the target pixel, the first matrix being used for indicating pixel information of a directed edge and a reverse edge of the target pixel in a group of seam edges, that is, the first matrix being used for indicating an initial pixel value of a neighboring point of the target pixel in the lightmap and a bake result coefficient of the target pixel, and the second matrix being used for indicating an initial pixel value of the target pixel in the lightmap;

a second acquiring unit, configured to acquire a third matrix based on the first matrix and the second matrix, the third matrix being used for indicating a to-be-updated pixel value of the target pixel; and an updating unit, configured to update the target pixel from the initial pixel value to the to-be-updated pixel value based on the third matrix, to obtain the repaired lightmap.

In a possible implementation, the second acquiring unit is configured to:

process the first matrix and the second matrix based on a conjugate gradient method, to obtain the third matrix; or process the first matrix and the second matrix based on a least square method, to obtain the third matrix; or process the first matrix and the second matrix based on the Cholesky decomposition method, to obtain the third matrix.

In a possible implementation, a location point in the seam edge is corresponding to a pair of target pixels in the lightmap, and a group of neighboring points is obtained by sampling each pair of target pixels; a quantity of rows of the first matrix is a first target quantity, and a quantity of columns is a second target quantity, where the first target quantity is a value obtained by adding the sampling quantity of the seam edge to the quantity of the target pixels, that is, the first target quantity is a value obtained by adding the sampling group quantity of the neighboring point to the quantity of the target pixels, and the second target quantity is a quantity of the target pixels; and a quantity of rows of the second matrix is the first target quantity, and a quantity of columns of the second matrix is one.

All of the above optional technical solutions can be combined randomly to form optional embodiments of the present disclosure. Details are not described herein again.

During image rendering, the image rendering apparatus provided in the foregoing embodiments is illustrated with an example of division of the foregoing functional modules. In actual application, the functions can be allocated to and completed by different functional modules according to requirements, that is, the internal structure of the electronic device is divided into different functional modules, to implement all or some of the functions described above. In addition, the image rendering apparatus provided in the foregoing embodiment and the image rendering method embodiment belong to the same concept. For a specific implementation process, refer to the image rendering method embodiment. Details are not described herein again.

Figure 10:
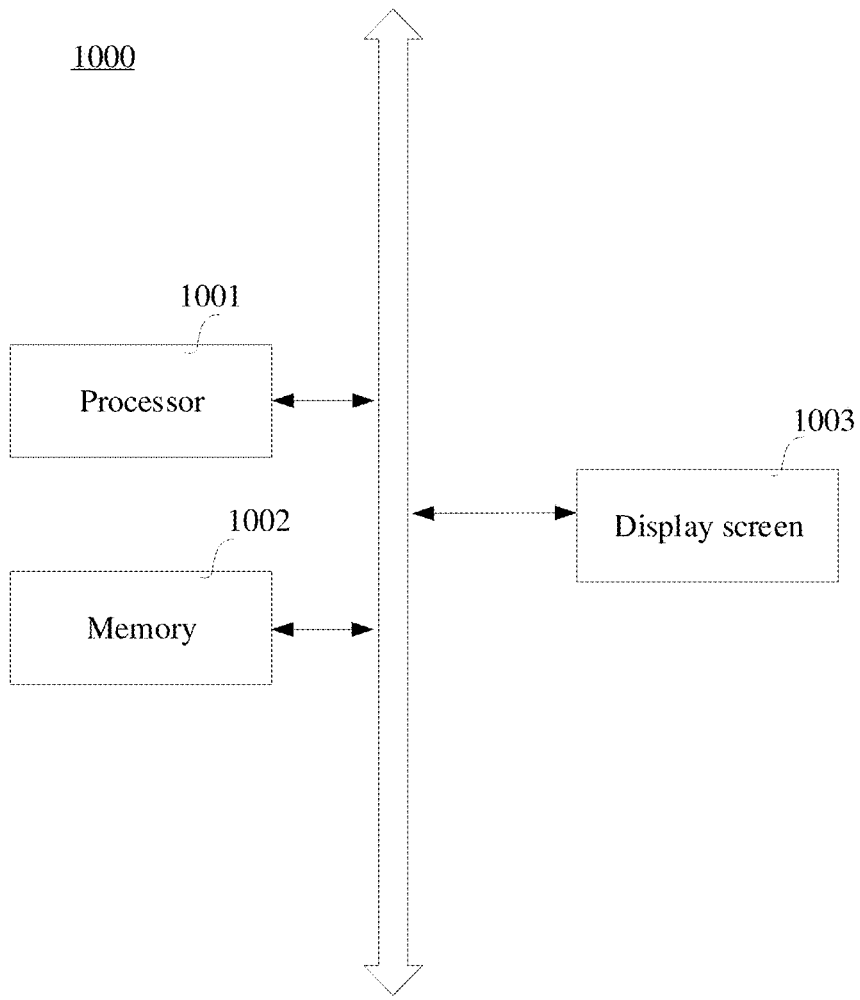
FIG. 10 is a schematic structural diagram of an electronic device according to an embodiment of this application.

FIG. 10 is a schematic structural diagram of an electronic device according to an embodiment of this application. Optionally, descriptions are made by using an example in which the electronic device is a terminal. A device type of the terminal 1000 may include: a smartphone, a tablet computer, a Moving Picture Experts Group Audio Layer III (MP3) player, a Moving Picture Experts Group Audio Layer IV (MP4) player, a laptop computer, or a desktop computer. The terminal 1000 may also be referred to by other names as user equipment, a portable terminal, a laptop terminal, a desktop terminal, etc.

Generally, the terminal 1000 includes: a processor 1001 and a memory 1002.

Optionally, the processor 1001 may include one or more processing cores, for example, may be a 4-core processor or an 8-core processor. Optionally, the processor 1001 may be implemented in at least one hardware form of a digital signal processor (DSP), a field-programmable gate array (FPGA), and a programmable logic array (PLA). In some embodiments, the processor 1001 includes a main processor and a co-processor. The main processor is a processor for processing data in a wake-up state, also referred to as a central processing unit (CPU). The coprocessor is a low power consumption processor configured to process data in a standby state. In some embodiments, the processor 1001 is integrated with a graphics processing unit (GPU). The GPU is configured to render and draw content that needs to be displayed on a display screen. In some embodiments, the processor 1001 further includes an artificial intelligence (AI) processor. The AI processor is configured to process a computing operation related to machine learning.

In some embodiments, the memory 1002 includes one or more computer-readable storage media. Optionally, the computer-readable storage medium is non-transient. Optionally, the memory 1002 further includes a high-speed random access memory and a non-volatile memory, such as one or more magnetic disk storage devices or flash storage devices. In some embodiments, the non-transient computer readable storage medium in the memory 1002 is configured to store at least one segment of program code, and the at least one segment of program code is used by the processor 1001 to implement the image rendering method provided in the embodiments of this application.

In some embodiments, the terminal 1000 may further optionally include a display screen 1003.

The display screen 1003 is configured to display a user interface (UI). Optionally, the UI may include a graph, a text, an icon, a video, and any combination thereof. When the display screen 1003 is a touch display screen, the display screen 1003 also has the ability to collect a touch signal at or above the surface of the display screen 1003. The touch signal may be inputted to the processor 1001 for processing as a control signal. Optionally, the display screen 1003 is further configured to provide a virtual button and/or a virtual keyboard, which is also referred to as a soft button and/or a soft keyboard. In some embodiments, there is one display screen 1003 arranged on a front panel of the terminal 1000. In some other embodiments, there are at least two display screens 1003 respectively arranged on different surfaces of the terminal 1000 or in a folded design. In still other embodiments, the display screen 1003 is a flexible display screen arranged on a curved or folded surface of the terminal 1000. Even, optionally, the display screen 1003 is even set in a non-rectangular irregular pattern, namely, a special-shaped screen. Optionally, the display screen 1003 is manufactured by using a material such as a liquid crystal display (LCD) or an organic light-emitting diode (OLED).

A person skilled in the art can understand that the structure shown in FIG. 10 does not constitute a limitation to the terminal 1000, and the terminal may include more or fewer components than those shown in the figure, or some components may be combined, or a different component arrangement may be used.

In some embodiments, an electronic device is provided, where the electronic device includes one or more processors and one or more memories, the one or more memories store at least one segment of program code, and the at least one segment of program code is loaded by the one or more processors to perform the following operations: acquiring a lightmap of a target three-dimensional model in response to a light rendering instruction; acquiring a seam edge of the target three-dimensional model; determining, in the lightmap, a target pixel corresponding to the seam edge; and updating an initial pixel value of the target pixel in the lightmap to obtain a repaired lightmap, a texture in the repaired lightmap being continuous.

In some embodiments, a group of seam edges includes a directed edge and a reverse edge of the directed edge, and vertexes between the directed edge and the reverse edge overlap and have opposite directions; and the at least one segment of program code is loaded by the one or more processors to perform the following operations: acquiring a plurality of vertexes on at least one surface of the target three-dimensional model; and determining, in response to existence of a reverse edge of a directed edge formed by at least two vertexes of the plurality of vertexes, the directed edge and the reverse edge as a group of seam edges.

In some embodiments, the at least one segment of program code is loaded by the one or more processors to perform the following operations: determining a directed edge based on any one of the plurality of vertexes and a next vertex; determining an auxiliary edge whose vertex overlaps with a vertex of the directed edge and whose direction is opposite to a direction of the directed edge; and determining the auxiliary edge as the reverse edge of the directed edge when the auxiliary edge is another directed edge.

In some embodiments, the at least one segment of program code is loaded by the one or more processors to perform the following operations: determining the auxiliary edge as the reverse edge of the directed edge in response to a same edge as the auxiliary edge is found in a directed edge set of the target three-dimensional model.

In some embodiments, the at least one segment of program code is loaded by the one or more processors to perform the following operations: adding the directed edge to the directed edge set in response to the same edge as the auxiliary edge not being found in the directed edge set.

In some embodiments, the at least one segment of program code is loaded by the one or more processors to perform the following operations: acquiring, for any group of seam edges, pixel location information of a pixel corresponding to a vertex of the seam edge in the lightmap; determining, based on the pixel location information, a pixel sampling quantity corresponding to the seam edge; and determining the target pixel based on the pixel location information and the pixel sampling quantity.

In some embodiments, the at least one segment of program code is loaded by the one or more processors to perform the following operations: determining an iteration step of pixel sampling based on the pixel location information and the pixel sampling quantity; performing pixel sampling based on the iteration step by using a pixel corresponding to any vertex as a start point; and acquiring a sampling point determined in the pixel sampling as the target pixel.

In some embodiments, the at least one segment of program code is loaded by the one or more processors to perform the following operations: acquiring an edge length of a directed edge in the seam edge and an edge length of the reverse edge of the directed edge; and determining a value obtained by multiplying a maximum value of the edge length of the directed edge and the edge length of the reverse edge by a sampling quality parameter, as the pixel sampling quantity.

In some embodiments, the at least one segment of program code is loaded by the one or more processors to perform the following operations: constructing a first matrix and a second matrix based on the target pixel, the first matrix being used for indicating an initial pixel value of a neighboring point of the target pixel in the lightmap and a bake result coefficient of the target pixel, and the second matrix being used for indicating an initial pixel value of the target pixel in the lightmap; acquiring a third matrix based on the first matrix and the second matrix, the third matrix being used for indicating a to-be-updated pixel value of the target pixel; and updating the target pixel from the initial pixel value to the to-be-updated pixel value based on the third matrix, to obtain the repaired lightmap.

In some embodiments, the at least one segment of program code is loaded by the one or more processors to perform the following operations: processing the first matrix and the second matrix based on a conjugate gradient method, to obtain the third matrix; or processing the first matrix and the second matrix based on a least square method, to obtain the third matrix; or processing the first matrix and the second matrix based on the Cholesky decomposition method, to obtain the third matrix.

In some embodiments, a location point in the seam edge is corresponding to a pair of target pixels in the lightmap, and a group of neighboring points is obtained by sampling each pair of target pixels; a quantity of rows of the first matrix is a first target quantity, a quantity of columns thereof is a second target quantity, the first target quantity is a value obtained by adding a quantity of sampling groups of neighboring points to a quantity of target pixels, and the second target quantity is the quantity of target pixels; and a quantity of rows of the second matrix is the first target quantity, and a quantity of columns of the second matrix is one.

In an example embodiment, a computer readable storage medium is further provided, for example, a memory that includes at least one segment of program code. The at least one segment of program code may be executed by a processor in a terminal to complete the image rendering method in the foregoing embodiment. For example, the computer-readable storage medium includes a read-only memory (ROM), a random access memory (RAM), a compact disc read-only memory (CD-ROM), a magnetic tape, a floppy disk, an optical data storage device, or the like.

In some embodiments, a computer readable storage medium is provided, where the storage medium stores at least one segment of program code, and the at least one segment of program code is loaded by a processor to perform the following operations: acquiring a lightmap of a target three-dimensional model in response to a light rendering instruction; acquiring a seam edge of the target three-dimensional model; determining, in the lightmap, a target pixel corresponding to the seam edge; and updating an initial pixel value of the target pixel in the lightmap to obtain a repaired lightmap, a texture in the repaired lightmap being continuous.

In some embodiments, a group of seam edges includes a directed edge and a reverse edge of the directed edge, and vertexes between the directed edge and the reverse edge overlap and have opposite directions; and the at least one segment of program code is loaded by the processor to perform the following operations: acquiring a plurality of vertexes on at least one surface of the target three-dimensional model; and determining, in response to existence of a reverse edge of a directed edge formed by at least two vertexes of the plurality of vertexes, the directed edge and the reverse edge as a group of seam edges.

In some embodiments, the at least one segment of program code is loaded by the processor to perform the following operations: determining a directed edge based on any one of the plurality of vertexes and a next vertex; determining an auxiliary edge whose vertex overlaps with a vertex of the directed edge and whose direction is opposite to a direction of the directed edge; and determining the auxiliary edge as the reverse edge of the directed edge when the auxiliary edge is another directed edge.

In some embodiments, the at least one segment of program code is loaded by the processor to perform the following operations: determining the auxiliary edge as the reverse edge of the directed edge in response to a same edge as the auxiliary edge being found in a directed edge set of the target three-dimensional model.

In some embodiments, the at least one segment of program code is loaded by the processor to perform the following operations: adding the directed edge to the directed edge set in response to the same edge as the auxiliary edge not being found in the directed edge set.

In some embodiments, the at least one segment of program code is loaded by the processor to perform the following operations: acquiring, for any group of seam edges, pixel location information of a pixel corresponding to a vertex of the seam edge in the lightmap; determining, based on the pixel location information, a pixel sampling quantity corresponding to the seam edge; and determining the target pixel based on the pixel location information and the pixel sampling quantity.

In some embodiments, the at least one segment of program code is loaded by the processor to perform the following operations: determining an iteration step of pixel sampling based on the pixel location information and the pixel sampling quantity; performing pixel sampling based on the iteration step by using a pixel corresponding to any vertex as a start point; and acquiring a sampling point determined in the pixel sampling as the target pixel.

In some embodiments, the at least one segment of program code is loaded by the processor to perform the following operations: acquiring an edge length of a directed edge in the seam edge and an edge length of the reverse edge of the directed edge; and determining a value obtained by multiplying a maximum value of the edge length of the directed edge and the edge length of the reverse edge by a sampling quality parameter, as the pixel sampling quantity.

In some embodiments, the at least one segment of program code is loaded by the processor to perform the following operations: constructing a first matrix and a second matrix based on the target pixel, the first matrix being used for indicating an initial pixel value of a neighboring point of the target pixel in the lightmap and a bake result coefficient of the target pixel, and the second matrix being used for indicating an initial pixel value of the target pixel in the lightmap; acquiring a third matrix based on the first matrix and the second matrix, the third matrix being used for indicating a to-be-updated pixel value of the target pixel; and updating the target pixel from the initial pixel value to the to-be-updated pixel value based on the third matrix, to obtain the repaired lightmap.

In some embodiments, the at least one segment of program code is loaded by the processor to perform the following operations: processing the first matrix and the second matrix based on a conjugate gradient method, to obtain the third matrix; or processing the first matrix and the second matrix based on a least square method, to obtain the third matrix; or processing the first matrix and the second matrix based on the Cholesky decomposition method, to obtain the third matrix.

In some embodiments, a location point in the seam edge is corresponding to a pair of target pixels in the lightmap, and a group of neighboring points is obtained by sampling each pair of target pixels; a quantity of rows of the first matrix is a first target quantity, a quantity of columns thereof is a second target quantity, the first target quantity is a value obtained by adding a quantity of sampling groups of neighboring points to a quantity of target pixels, and the second target quantity is the quantity of target pixels; and a quantity of rows of the second matrix is the first target quantity, and a quantity of columns of the second matrix is one.

In an exemplary embodiment, a computer program product or a computer program is further provided, including one or more pieces of program code, the one or more pieces of program code being stored in a computer-readable storage medium. One or more processors of the electronic device can read the one or more segments of program code from the computer readable storage medium. The one or more processors execute the one or more segments of program code, so that an electronic device can execute the image rendering method in the foregoing embodiment.

A person of ordinary skill in the art may understand that all or some of the steps of the foregoing embodiments may be implemented by hardware or may be implemented by a program instructing relevant hardware. Optionally, the program is stored in a computer-readable storage medium. Optionally, the storage medium mentioned above is a ROM, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. An image rendering method, performed by an electronic device and comprising:
acquiring a lightmap of a target three-dimensional model in response to a light rendering instruction;
acquiring a seam edge of the target three-dimensional model, wherein a group of seam edges comprises a directed edge and a reverse edge of the directed edge, and vertexes between the directed edge and the reverse edge overlap and have opposite directions, and wherein the acquiring a seam edge of the target three-dimensional model comprises:
acquiring a plurality of vertexes on at least one surface of the target three-dimensional model; and
determining, in response to existence of a reverse edge of a directed edge formed by at least two vertexes of the plurality of vertexes, the directed edge and the reverse edge as a group of seam edges;
determining, in the lightmap, a target pixel corresponding to the seam edge; and
updating an initial pixel value of the target pixel in the lightmap to obtain a repaired lightmap, a texture in the repaired lightmap being continuous.

2. The method according to claim 1, wherein before the determining, in response to existence of a reverse edge of a directed edge formed by at least two vertexes of the plurality of vertexes, the directed edge and the reverse edge as a group of seam edges, the method further comprises:
determining a directed edge based on any one of the plurality of vertexes and a next vertex;
determining an auxiliary edge whose vertex overlaps with a vertex of the directed edge and whose direction is opposite to a direction of the directed edge; and
determining the auxiliary edge as the reverse edge of the directed edge when the auxiliary edge is another directed edge.

3. The method according to claim 2, wherein the determining the auxiliary edge as the reverse edge of the directed edge when the auxiliary edge is another directed edge comprises:
  determining the auxiliary edge as the reverse edge of the directed edge in response to a same edge as the auxiliary edge being found in a directed edge set of the target three-dimensional model.

4. The method according to claim 3, wherein the method further comprises:
  adding the directed edge to the directed edge set in response to the same edge as the auxiliary edge not being found in the directed edge set.

5. The method according to claim 1, wherein the determining, in the lightmap, a target pixel corresponding to the seam edge comprises:
  acquiring, for any group of seam edges, pixel location information of a pixel corresponding to a vertex of the seam edge in the lightmap;
  determining, based on the pixel location information, a pixel sampling quantity corresponding to the seam edge; and
  determining the target pixel based on the pixel location information and the pixel sampling quantity.

6. The method according to claim 5, wherein the determining the target pixel based on the pixel location information and the pixel sampling quantity comprises:
  determining an iteration operation of pixel sampling based on the pixel location information and the pixel sampling quantity;
  performing pixel sampling based on the iteration operation by using a pixel corresponding to any vertex as a start point; and
  acquiring a sampling point determined in the pixel sampling as the target pixel.

7. The method according to claim 5, wherein the determining, based on the pixel location information, a pixel sampling quantity corresponding to the seam edge comprises:
  acquiring an edge length of a directed edge in the seam edge and an edge length of the reverse edge of the directed edge; and
  determining a value obtained by multiplying a maximum value of the edge length of the directed edge and the edge length of the reverse edge by a sampling quality parameter, as the pixel sampling quantity.

8. The method according to claim 1, wherein the updating an initial pixel value of the target pixel in the lightmap to obtain a repaired lightmap comprises:
  constructing a first matrix and a second matrix based on the target pixel, the first matrix being used to indicate an initial pixel value of a neighboring point of the target pixel in the lightmap and a bake result coefficient of the target pixel, and the second matrix being used to indicate an initial pixel value of the target pixel in the lightmap;
  acquiring a third matrix based on the first matrix and the second matrix, the third matrix being used to indicate a to-be-updated pixel value of the target pixel; and
  updating the target pixel from the initial pixel value to the to-be-updated pixel value based on the third matrix, to obtain the repaired lightmap.

9. The method according to claim 8, wherein the acquiring a third matrix based on the first matrix and the second matrix comprises:
  processing the first matrix and the second matrix based on a conjugate gradient method, to obtain the third matrix; or
  processing the first matrix and the second matrix based on a least square method, to obtain the third matrix; or
  processing the first matrix and the second matrix based on the Cholesky decomposition method, to obtain the third matrix.

10. The method according to claim 8, wherein a location point in the seam edge is corresponding to a pair of target pixels in the lightmap, and a group of neighboring points is obtained by sampling each pair of target pixels;
  a quantity of rows of the first matrix is a first target quantity, a quantity of columns thereof is a second target quantity, the first target quantity is a value obtained by adding a quantity of sampling groups of neighboring points to a quantity of target pixels, and the second target quantity is the quantity of target pixels; and
  a quantity of rows of the second matrix is the first target quantity, and a quantity of columns of the second matrix is one.

11. An image rendering apparatus, comprising:
  a memory storing a plurality of instructions; and
  a processor configured to execute the plurality of instructions, and upon execution of the plurality of instructions, is configured to:
    acquire a lightmap of a target three-dimensional model in response to a light rendering instruction;
    acquire a seam edge of the target three-dimensional model;
    determine, in the lightmap, a target pixel corresponding to the seam edge, wherein in order to determine, in the lightmap, the target pixel corresponding to the seam edge, the processor is configured to:
      acquire, for any group of seam edges, pixel location information of a pixel corresponding to a vertex of the seam edge in the lightmap;
      determine, based on the pixel location information, a pixel sampling quantity corresponding to the seam edge; and
      determine the target pixel based on the pixel location information and the pixel sampling quantity; and
    update an initial pixel value of the target pixel in the lightmap to obtain a repaired lightmap, a texture in the repaired lightmap being continuous.

12. The apparatus according to claim 11, wherein a group of seam edges comprises a directed edge and a reverse edge of the directed edge, and vertexes between the directed edge and the reverse edge overlap and have opposite directions; and wherein upon execution of the plurality of instructions, in order to acquire the seam edge of the target three-dimensional model, the processor is configured to:
  acquire a plurality of vertexes on at least one surface of the target three-dimensional model; and
  determine, in response to existence of a reverse edge of a directed edge formed by at least two vertexes of the plurality of vertexes, the directed edge and the reverse edge as a group of seam edges.

13. The apparatus according to claim 12, wherein before the determination of, in response to existence of a reverse edge of a directed edge formed by at least two vertexes of the plurality of vertexes, the directed edge and the reverse edge as a group of seam edges, the processor, upon execution of the plurality of instructions, is further configured to:
  determine a directed edge based on any one of the plurality of vertexes and a next vertex;

determine an auxiliary edge whose vertex overlaps with a vertex of the directed edge and whose direction is opposite to a direction of the directed edge; and determine the auxiliary edge as the reverse edge of the directed edge when the auxiliary edge is another directed edge.

14. The apparatus according to claim 11, wherein upon execution of the plurality instructions, in order to determine the target pixel based on the pixel location information and the pixel sampling quantity, the processor is configured to:

determine an iteration operation of pixel sampling based on the pixel location information and the pixel sampling quantity;

perform pixel sampling based on the iteration operation by using a pixel corresponding to any vertex as a start point; and acquire a sampling point determined in the pixel sampling as the target pixel.

15. A non-transitory computer readable storage medium storing a plurality of instructions executable by a processor, wherein the plurality of instructions, upon execution by the processor, is configured to cause the processor to:

acquire a lightmap of a target three-dimensional model in response to a light rendering instruction;

acquire a seam edge of the target three-dimensional model;

determine, in the lightmap, a target pixel corresponding to the seam edge; and update an initial pixel value of the target pixel in the lightmap to obtain a repaired lightmap, a texture in the repaired lightmap being continuous, wherein in order to cause the processor to update the initial pixel value of the target pixel in the lightmap to obtain the repaired lightmap, the plurality of instructions, upon execution by the processor, is configured to cause the processor to:

construct a first matrix and a second matrix based on the target pixel, the first matrix being used to indicate an initial pixel value of a neighboring point of the target pixel in the lightmap and a bake result coefficient of the target pixel, and the second matrix being used to indicate an initial pixel value of the target pixel in the lightmap;

acquire a third matrix based on the first matrix and the second matrix, the third matrix being used to indicate a to-be-updated pixel value of the target pixel; and update the target pixel from the initial pixel value to the to-be-updated pixel value based on the third matrix, to obtain the repaired lightmap.

16. The non-transitory computer readable storage medium according to claim 15, wherein in order to cause the processor to acquire a third matrix based on the first matrix and the second matrix, the plurality of instructions, upon execution by the processor, is configured to cause the processor to:

process the first matrix and the second matrix based on a conjugate gradient method, to obtain the third matrix; or process the first matrix and the second matrix based on a least square method, to obtain the third matrix; or process the first matrix and the second matrix based on the Cholesky decomposition method, to obtain the third matrix.

17. The non-transitory computer readable storage medium according to claim 15, wherein a location point in the seam edge corresponds to a pair of target pixels in the lightmap, and a group of neighboring points is obtained by sampling each pair of target pixels;

wherein a quantity of rows of the first matrix is a first target quantity, a quantity of columns thereof is a second target quantity, the first target quantity is a value obtained by adding a quantity of sampling groups of neighboring points to a quantity of target pixels, and the second target quantity is the quantity of target pixels; and wherein a quantity of rows of the second matrix is the first target quantity, and a quantity of columns of the second matrix is one.

* * * * *